US012274669B2

(12) United States Patent
Carson et al.

(10) Patent No.: US 12,274,669 B2
(45) Date of Patent: Apr. 15, 2025

(54) ADMINISTRATION METHODS FOR ORAL MEDICATIONS

(71) Applicant: Omnicare, LLC, Wilmington, OH (US)

(72) Inventors: Bradley E. Carson, Murfreesboro, TN (US); Mitchell Mosbacher, Maumee, OH (US); Michael J. Szesko, Freehold, NJ (US)

(73) Assignee: Omnicare, LLC, Wilmington, DE (US)

( * ) Notice: Subject to any disclaimer, the term of this patent is extended or adjusted under 35 U.S.C. 154(b) by 948 days.

(21) Appl. No.: 15/058,202

(22) Filed: Mar. 2, 2016

(65) Prior Publication Data

US 2016/0175195 A1 Jun. 23, 2016

Related U.S. Application Data

(62) Division of application No. 13/153,900, filed on Jun. 6, 2011, now abandoned.

(51) Int. Cl.
*A61J 1/03* (2023.01)
*B65D 77/04* (2006.01)
*B65D 77/20* (2006.01)

(52) U.S. Cl.
CPC ................. *A61J 1/03* (2013.01); *A61J 1/035* (2013.01); *B65D 77/0433* (2013.01); *B65D 77/2032* (2013.01); *B65D 77/204* (2013.01); *A61J 2205/30* (2013.01); *B65D 2577/205* (2013.01)

(58) Field of Classification Search
CPC .......... A61J 1/03; A61J 1/035; A61J 2205/30; B65D 2577/205; B65D 75/327; B65D 17/502; B65D 77/0433; B65D 77/2032
USPC ............................................................ 53/492
See application file for complete search history.

(56) References Cited

U.S. PATENT DOCUMENTS

| | | | | |
|---|---|---|---|---|
| 1,997,359 | A | 4/1935 | Cochrane, Jr. | |
| 3,083,821 | A * | 4/1963 | Woodson | B65D 75/5855 206/484 |
| 3,303,927 | A | 2/1967 | Ballard | |
| 3,433,352 | A | 3/1969 | Haigh | |
| 3,494,322 | A | 2/1970 | Dubbels | |
| 3,497,982 | A | 3/1970 | Schulz | |

(Continued)

FOREIGN PATENT DOCUMENTS

| | | |
|---|---|---|
| JP | 2003505154 A | 2/2003 |

OTHER PUBLICATIONS

Korean Intellectual Property Office, Notice of Preliminary Rejection issued in KR Patent Application No. 2012-0059812 dated May 21, 2018 (and partial English translation), 5 pages.

(Continued)

*Primary Examiner* — Anthony D Stashick
*Assistant Examiner* — Blaine G Neway
(74) *Attorney, Agent, or Firm* — Wood Herron & Evans LLP

(57) ABSTRACT

Methods for administering oral medications from a packaging are disclosed. The packaging includes a cover and a body with compartments each configured to hold at least one of the oral medications. The compartments have a circular arrangement on the body. The method may include at least partially detaching the cover from the body to access a separate opening to each of the compartments. In response to removing the cover, all of the oral medications may be removed from the compartments to empty the packaging.

12 Claims, 11 Drawing Sheets

(56) References Cited

U.S. PATENT DOCUMENTS

| | | | | | |
|---|---|---|---|---|---|
| 3,615,039 | A | * | 10/1971 | Ward | B65D 21/0233 206/518 |
| 3,737,026 | A | | 6/1973 | Whitecar | |
| 3,783,089 | A | * | 1/1974 | Hurst | B29C 53/60 220/359.3 |
| 3,809,220 | A | * | 5/1974 | Arcudi | B65D 75/58 206/484 |
| 3,941,248 | A | | 3/1976 | Moser et al. | |
| 4,015,709 | A | | 4/1977 | Millet | |
| 4,053,054 | A | * | 10/1977 | Lucas | B65D 1/36 206/534 |
| D250,880 | S | | 1/1979 | Stone et al. | |
| 4,196,809 | A | * | 4/1980 | Tonrey | B65D 77/2064 206/464 |
| 4,261,468 | A | | 4/1981 | Krebs | |
| 4,340,141 | A | | 7/1982 | Fischer | |
| 4,372,098 | A | * | 2/1983 | Mason | B65B 9/045 401/132 |
| 4,416,375 | A | | 11/1983 | Braverman et al. | |
| 4,444,310 | A | | 4/1984 | Odell | |
| 4,473,156 | A | | 9/1984 | Martin | |
| 4,474,294 | A | | 10/1984 | Koppelmans | |
| 4,528,933 | A | * | 7/1985 | Allen | A61J 7/04 116/308 |
| 4,653,644 | A | | 3/1987 | Sullivan et al. | |
| 4,655,209 | A | | 4/1987 | Scott | |
| 4,706,815 | A | | 11/1987 | Curtis et al. | |
| 4,714,164 | A | * | 12/1987 | Bachner | B65D 5/06 206/518 |
| 4,733,863 | A | | 3/1988 | Novotny | |
| 4,799,590 | A | | 1/1989 | Furman | |
| 4,811,845 | A | | 3/1989 | Baggett | |
| 4,844,251 | A | * | 7/1989 | Gueret | B65D 81/3294 206/222 |
| 4,889,236 | A | * | 12/1989 | Bartell | B65D 75/327 206/531 |
| 4,889,237 | A | | 12/1989 | Brandon | |
| 4,915,256 | A | | 4/1990 | Tump | |
| 4,958,731 | A | | 9/1990 | Calcerano | |
| 5,014,851 | A | | 5/1991 | Wick | |
| D321,788 | S | * | 11/1991 | Chen | 220/524 |
| D321,826 | S | | 11/1991 | Page | |
| 5,064,071 | A | | 11/1991 | Kerfoot, Jr. | |
| D336,216 | S | | 6/1993 | Rohrbeck | |
| 5,322,166 | A | | 6/1994 | Crowther | |
| 5,325,968 | A | | 7/1994 | Sowden | |
| 5,346,259 | A | | 9/1994 | Mocilnikar et al. | |
| 5,358,118 | A | | 10/1994 | Thompson et al. | |
| 5,368,187 | A | | 11/1994 | Poncetta et al. | |
| 5,377,839 | A | | 1/1995 | Relyea et al. | |
| 5,390,796 | A | | 2/1995 | Kerfoot, Jr. | |
| 5,393,032 | A | | 2/1995 | Cederroth | |
| 5,425,474 | A | | 6/1995 | Dalea et al. | |
| 5,542,539 | A | * | 8/1996 | Early | B65D 5/725 206/363 |
| 5,624,036 | A | | 4/1997 | Roulin et al. | |
| 5,718,245 | A | * | 2/1998 | Horn | A61F 15/001 128/897 |
| D392,562 | S | | 3/1998 | Lo | |
| 5,727,819 | A | | 3/1998 | Grosskopf et al. | |
| 5,762,199 | A | | 6/1998 | Aguilera | |
| 5,775,505 | A | | 7/1998 | Vasquez et al. | |
| 5,788,079 | A | | 8/1998 | Bouthiette | |
| 5,788,974 | A | | 8/1998 | D'Amico et al. | |
| 5,833,071 | A | | 11/1998 | Ray | |
| 5,873,483 | A | | 2/1999 | Gortz et al. | |
| 5,899,335 | A | | 5/1999 | Boyer et al. | |
| 5,944,191 | A | | 8/1999 | Ray et al. | |
| 5,975,304 | A | | 11/1999 | Cain et al. | |
| 5,988,367 | A | | 11/1999 | Gemma, Jr. et al. | |
| 6,041,932 | A | | 3/2000 | Holmberg | |
| D429,149 | S | | 8/2000 | Humphrey | |
| 6,155,423 | A | | 12/2000 | Katzner et al. | |
| 6,158,585 | A | | 12/2000 | Labat et al. | |
| D440,871 | S | | 4/2001 | Lo | |
| 6,247,590 | B1 | | 6/2001 | Baker | |
| 6,293,403 | B1 | | 9/2001 | Holmberg | |
| D451,666 | S | | 12/2001 | Zastrow | |
| 6,375,956 | B1 | | 4/2002 | Hermelin et al. | |
| 6,540,082 | B2 | | 4/2003 | Peterson | |
| 6,564,945 | B1 | | 5/2003 | Weinstein et al. | |
| 6,681,935 | B1 | * | 1/2004 | Lewis | A61J 1/035 206/534 |
| 6,776,285 | B2 | | 8/2004 | Shibata | |
| 6,830,153 | B2 | | 12/2004 | French et al. | |
| 6,988,619 | B2 | | 1/2006 | Klatt | |
| 7,055,294 | B1 | * | 6/2006 | Lewis | A61J 1/035 206/534 |
| D528,434 | S | | 9/2006 | Wolpow | |
| D533,464 | S | | 12/2006 | Wolpow | |
| D537,734 | S | | 3/2007 | Wolpow | |
| 7,210,580 | B2 | | 5/2007 | Elliott | |
| 7,228,970 | B2 | | 6/2007 | Holmberg | |
| 7,293,653 | B2 | | 11/2007 | Von Falkenhausen | |
| D563,095 | S | | 3/2008 | Sabbag | |
| 7,395,928 | B2 | | 7/2008 | Bertsch et al. | |
| D575,148 | S | | 8/2008 | Sagel | |
| 7,584,846 | B2 | | 9/2009 | Senter | |
| 7,624,872 | B2 | | 12/2009 | Elliott | |
| 7,644,822 | B2 | | 1/2010 | Elliott | |
| 7,690,173 | B2 | | 4/2010 | Luciano, Jr. et al. | |
| 7,699,173 | B2 | | 4/2010 | Hession | |
| 7,758,936 | B2 | | 7/2010 | Spallek et al. | |
| 7,770,732 | B2 | | 8/2010 | Stroppolo et al. | |
| D628,471 | S | | 12/2010 | Golota et al. | |
| D629,702 | S | | 12/2010 | Caldwell et al. | |
| 7,866,476 | B2 | | 1/2011 | McGonagle et al. | |
| 7,942,451 | B2 | | 5/2011 | Adler | |
| 8,074,426 | B2 | * | 12/2011 | Luciano, Jr. | A61J 7/0069 53/411 |
| D670,178 | S | | 11/2012 | Carson | |
| 8,712,582 | B1 | | 4/2014 | Luciano, Jr. et al. | |
| 8,752,704 | B2 | | 6/2014 | Leon Alonso et al. | |
| 8,777,013 | B1 | | 7/2014 | Jalindre | |
| 8,925,726 | B2 | * | 1/2015 | Bergey | B65D 75/327 206/532 |
| 2002/0066691 | A1 | | 6/2002 | Varon | |
| 2003/0209461 | A1 | | 11/2003 | French et al. | |
| 2004/0159576 | A1 | * | 8/2004 | Holmberg | A61J 7/0069 206/538 |
| 2005/0097009 | A1 | * | 5/2005 | Reeves-Collins | G06Q 30/06 705/26.1 |
| 2005/0109656 | A1 | | 5/2005 | Ishizaki | |
| 2005/0109658 | A1 | * | 5/2005 | Bindford | A61J 7/04 206/534 |
| 2005/0109659 | A1 | | 5/2005 | Hickey et al. | |
| 2005/0112194 | A1 | | 5/2005 | Gervais et al. | |
| 2005/0161364 | A1 | | 7/2005 | DeJonge | |
| 2006/0086640 | A1 | | 4/2006 | Luciano et al. | |
| 2006/0219577 | A1 | | 10/2006 | Newman | |
| 2006/0219595 | A1 | | 10/2006 | Peters | |
| 2006/0278558 | A1 | * | 12/2006 | Nivala | B65D 75/327 206/538 |
| 2007/0131576 | A1 | | 6/2007 | Ehling et al. | |
| 2007/0184078 | A1 | | 8/2007 | Chen | |
| 2007/0205132 | A1 | | 9/2007 | Bouthiette | |
| 2007/0267430 | A1 | | 11/2007 | Luciano et al. | |
| 2008/0047867 | A1 | | 2/2008 | Holmberg | |
| 2008/0190809 | A1 | | 8/2008 | Simon et al. | |
| 2008/0272022 | A1 | | 11/2008 | Kulkarni et al. | |
| 2008/0312957 | A1 | | 12/2008 | Luciano, Jr. et al. | |
| 2009/0078606 | A1 | * | 3/2009 | Conley | A61J 7/0472 206/534 |
| 2009/0194451 | A1 | * | 8/2009 | Leiner | B65D 75/327 206/524.1 |
| 2009/0230013 | A1 | * | 9/2009 | Born | A61J 1/035 206/531 |
| 2009/0277815 | A1 | | 11/2009 | Kohl | |
| 2009/0283437 | A1 | | 11/2009 | Angelucci et al. | |
| 2009/0321296 | A1 | | 12/2009 | Luciano, Jr. et al. | |
| 2010/0065464 | A1 | | 3/2010 | Elliott | |
| 2010/0072104 | A1 | | 3/2010 | Kohl | |

(56) References Cited

U.S. PATENT DOCUMENTS

| | | | |
|---|---|---|---|
| 2010/0108559 | A1 | 5/2010 | Kohl |
| 2010/0108677 | A1 | 5/2010 | Loftin et al. |
| 2010/0147734 | A1 | 6/2010 | Luciano, Jr. et al. |
| 2010/0154365 | A1 | 6/2010 | Williams-Hartman |
| 2011/0049003 | A1 | 3/2011 | Bellamah et al. |
| 2011/0068040 | A1 | 3/2011 | Kendig et al. |
| 2012/0091027 | A1 | 4/2012 | Ozawa et al. |

OTHER PUBLICATIONS

Canadian Intellectual Property Office, Office Action issued in CA Patent Application No. 2,775,248, dated Apr. 23, 2018, 3 pages.

* cited by examiner

ADMINISTRATION METHODS FOR ORAL MEDICATIONS

CROSS REFERENCE TO RELATED APPLICATIONS

This application is a divisional of U.S. patent application Ser. No. 13/153,900, filed on Jun. 6, 2011 (pending), the disclosures of which are incorporated by reference herein in their entirety.

BACKGROUND

The invention relates generally to packagings for oral medications and methods for administering oral medications from a packaging to a patient.

Prescription and non-prescription daily medications may be distributed to patients contained in a variety of different packages including conventional pill vials and blister cards. In many prescription dosing regimes, multiple oral medications are administered on a continuing basis to a patient at different times over the course of each day. The need to remove the oral medication from multiple different vials at specifically prescribed times each day can be confusing to a patient, especially senior patients. Patient confusion may contribute to partial prescription non-compliance or even complete prescription non-compliance if the patient fails to follow treatment directions.

Improved packagings and administration methods for oral medications are needed that can improve prescription compliance.

SUMMARY

In an embodiment of the invention, a packaging is provided for holding a plurality of oral medications. The packaging includes a cover and a body with a plurality of compartments each configured to hold at least one of the oral medications. The compartments have a circular arrangement relative to a point on the body.

In another embodiment of the invention, a method is provided for administering a plurality of oral medications from a packaging having a body with compartments holding the oral medications and a cover attached to the body for confining the oral medications in the compartments. The method may include at least partially detaching the cover from the body to access a separate opening to each of the compartments. In response to at least partially detaching the cover from the body, all of the oral medications may be removed from the compartments to empty the packaging.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
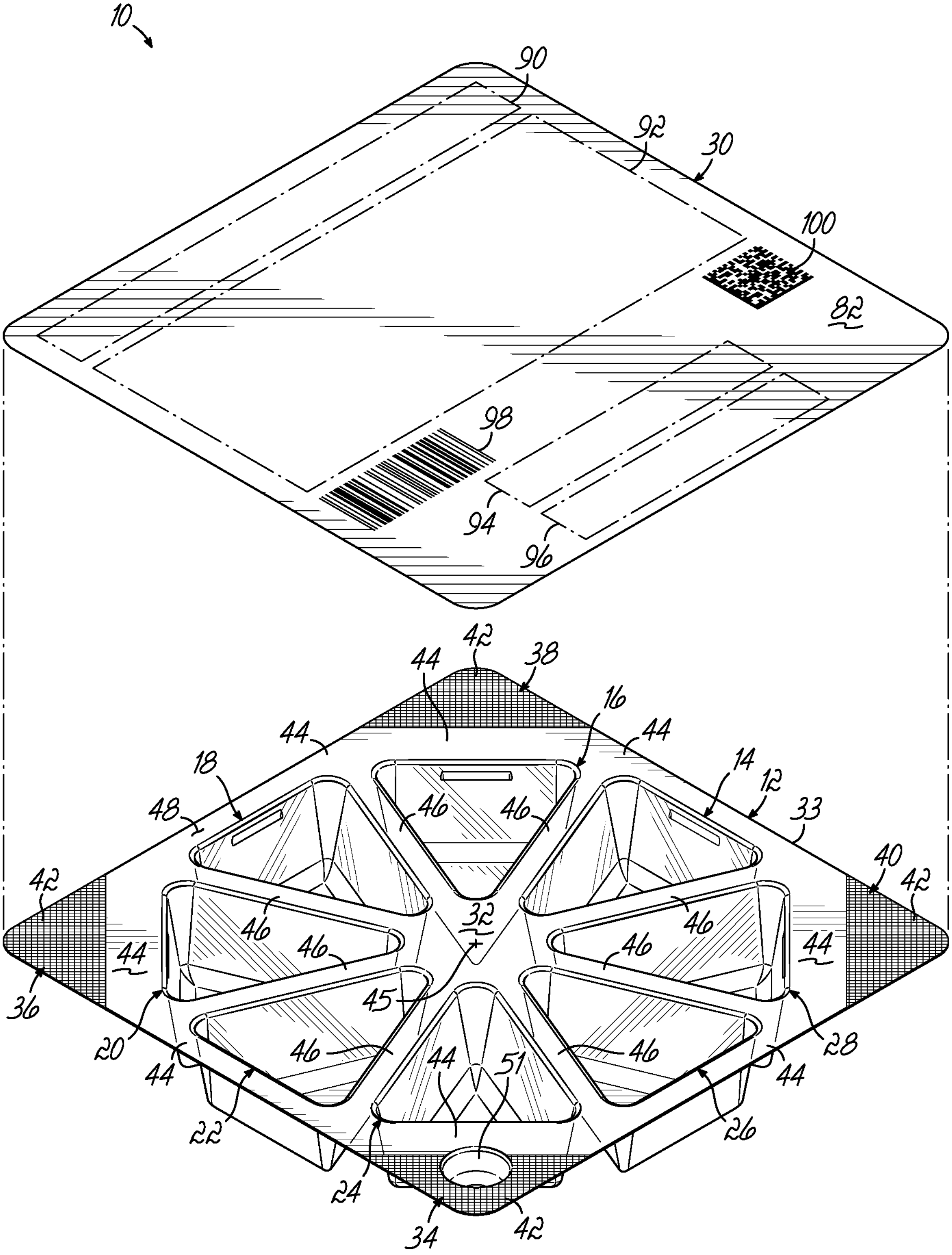
FIG. 1 is an exploded top perspective view of a packaging in accordance with an embodiment of the invention.
Figure 1A:
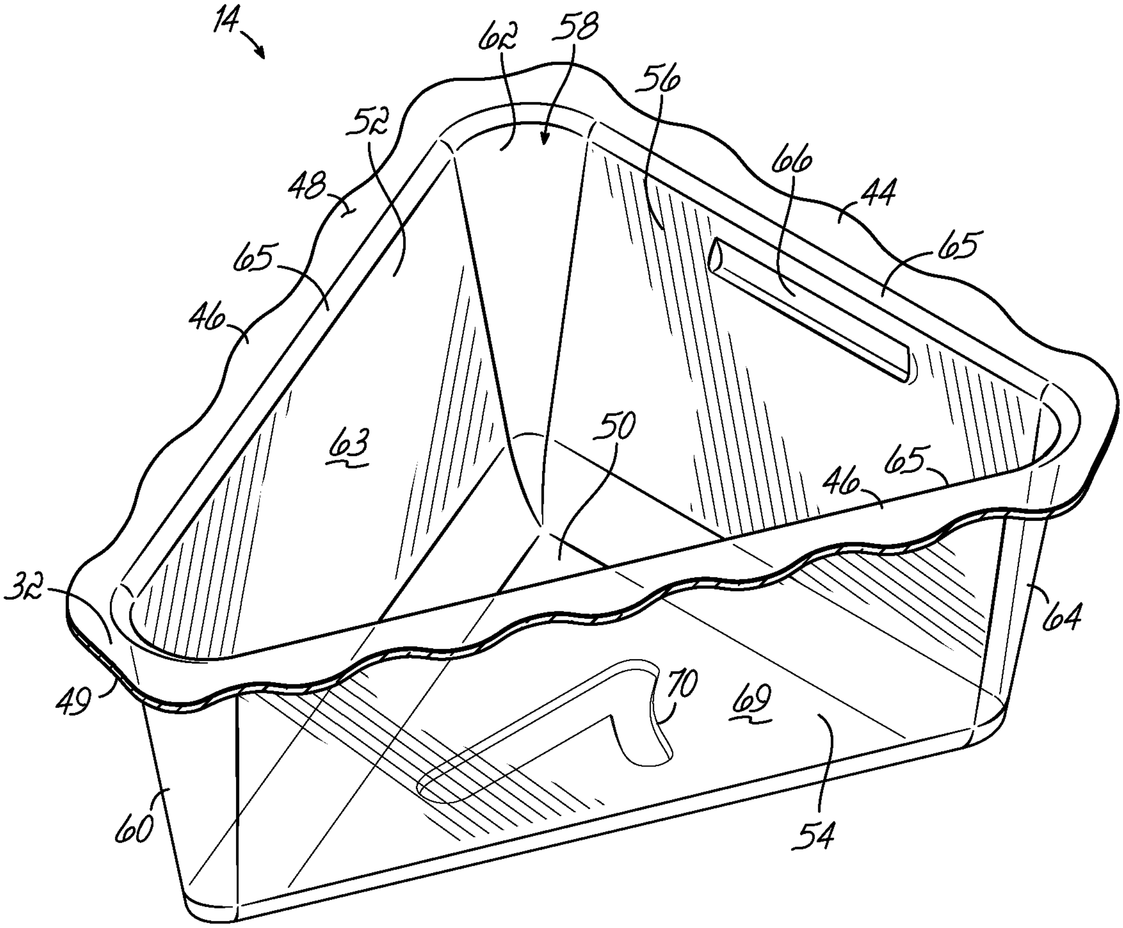
FIG. 1A is a perspective view of one of the compartments of the packaging shown in FIG. 1.
Figure 1B:
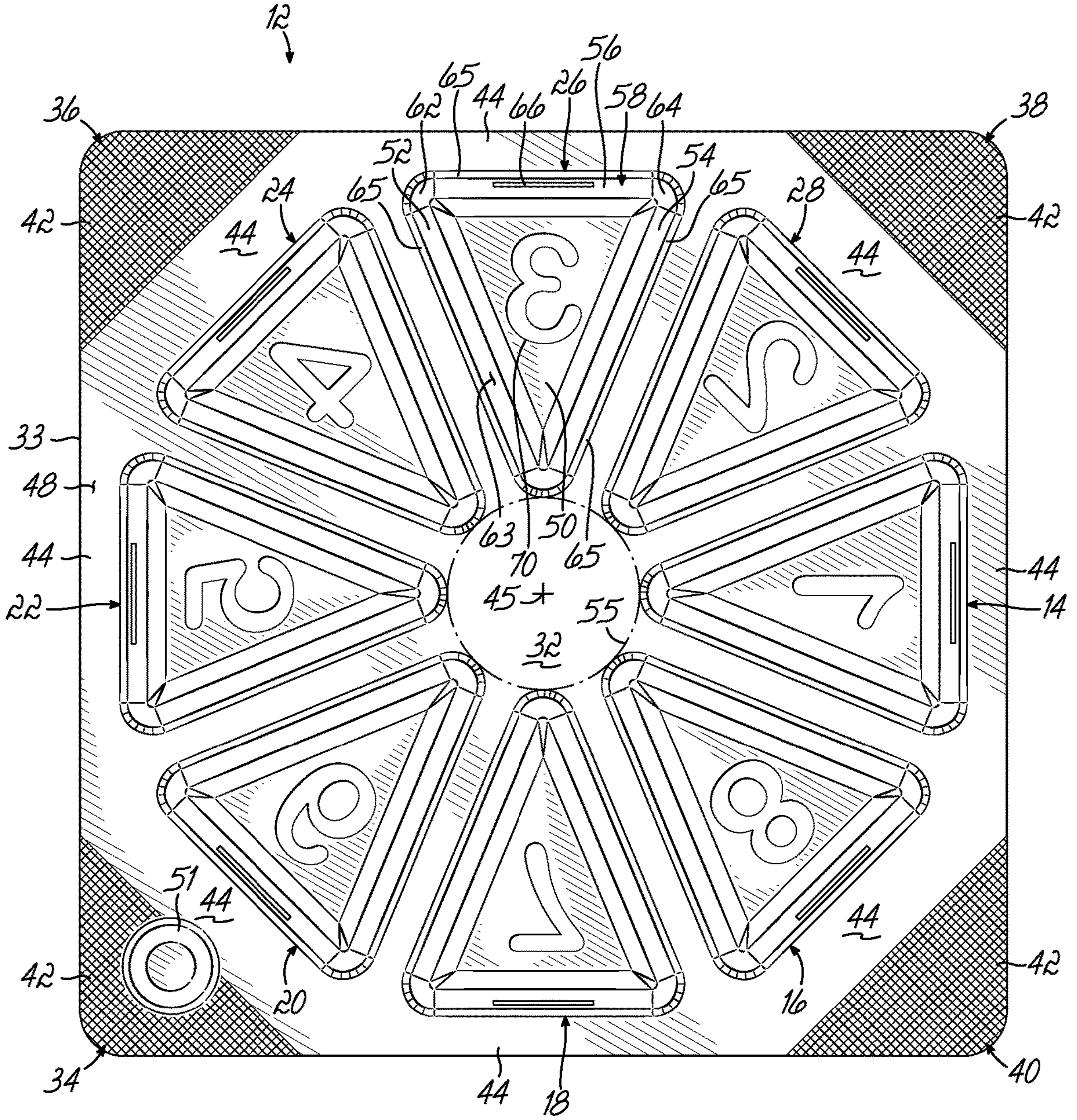
FIG. 1B is a top view of the body of the packaging of FIG. 1.
Figure 2:
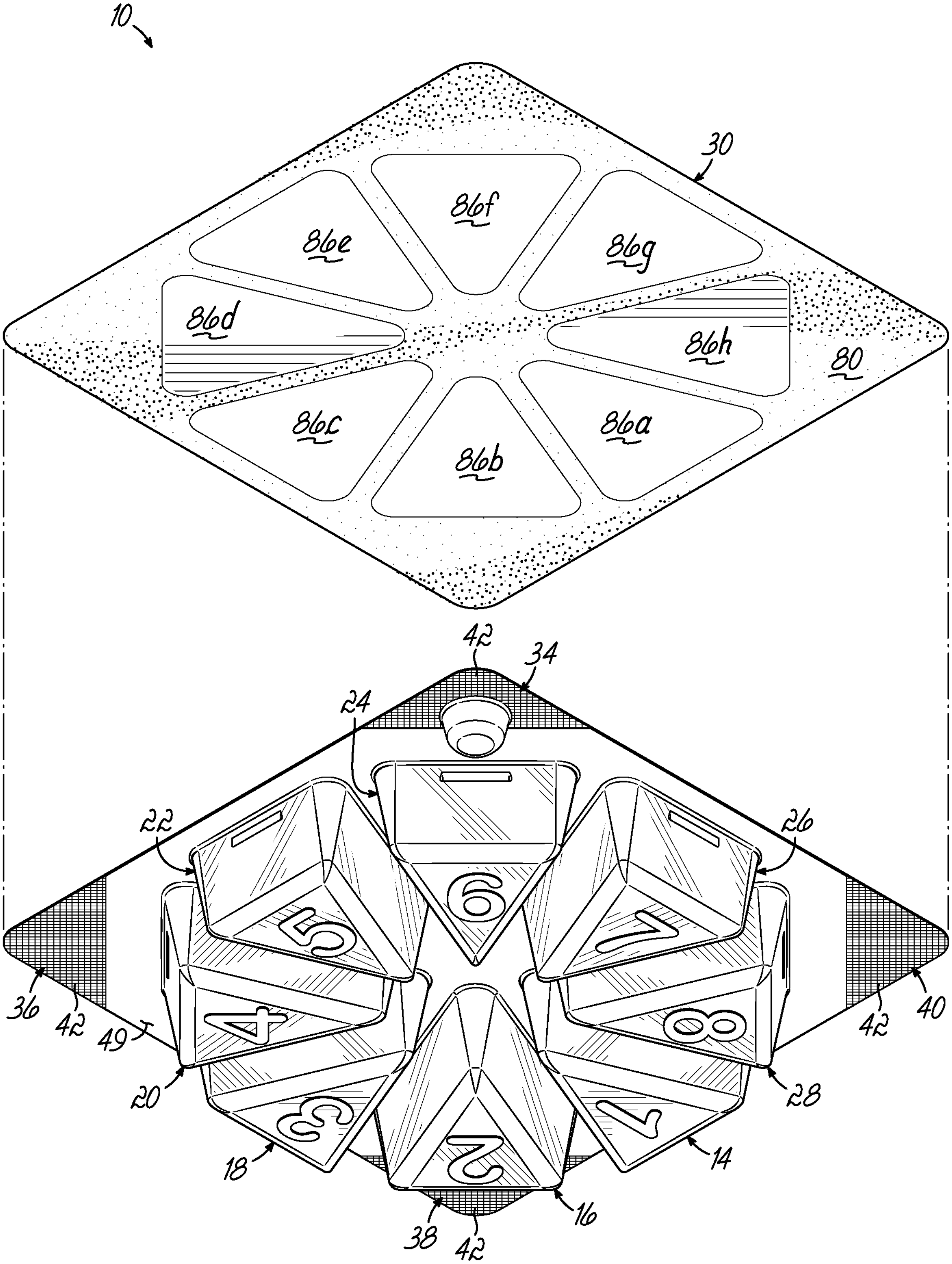
FIG. 2 is an exploded bottom perspective view of the packaging of FIG. 1.
Figure 8:
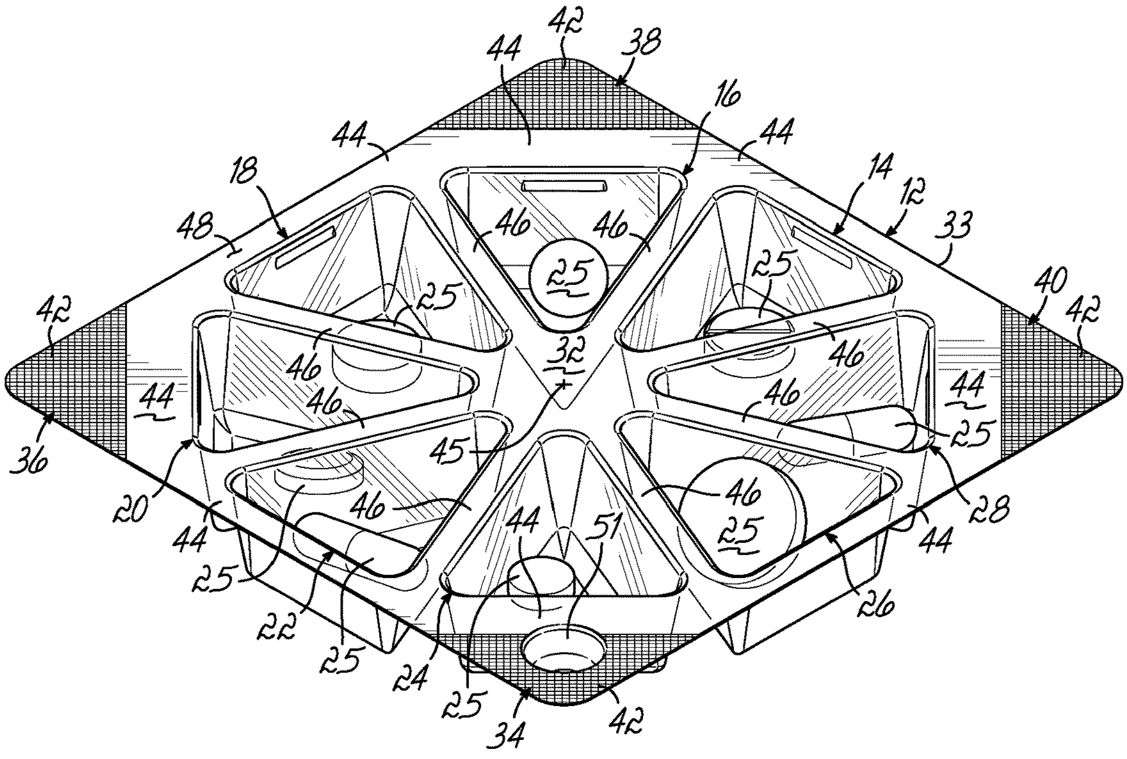
FIG. 8 is a top perspective view of the packaging illustrating the at least partial detachment of the cover from the body prior to administration of the oral medications from the packaging to a patient.

With reference to FIGS. 1, 1B, and 2 and in accordance with an embodiment of the invention, an oral medication packaging 10 includes a body 12 with a plurality of compartments 14, 16, 18, 20, 22, 24, 26, 28 and a lidding sheet in the form of a cover 30. The cover 30 is joined to the body 12 in order to seal closed the compartments 14, 16, 18, 20, 22, 24, 26, 28. In the representative embodiment, the number of compartments 14, 16, 18, 20, 22, 24, 26, 28 is eight. Each of the compartments 14, 16, 18, 20, 22, 24, 26, 28 may be configured to receive and hold a unit dose of an oral medication 25 (FIG. 8). After the oral medications 25 are placed into the compartments 14, 16, 18, 20, 22, 24, 26, 28 and the cover 30 is attached to the body 12 to form the packaging 10, the assembly (FIGS. 5 and 6) comprises a package that is sealed to prevent the ingress of environmental contaminants and that is in a state prepared for subsequent distribution to a patient.

Each of the oral medications 25 may be any type of ingestible substance capable of being categorized as an oral medication. The ingestible substance comprising each of the oral medications 25 may include, but is not limited to, one or more pharmaceuticals, medicaments, one or more compositions, one or more drugs, one or more vitamins, one or more mineral supplements, and one or more placebos, either alone or in combination and may be dispensed by prescription or over-the-counter. The oral medications 25 may be provided in various dosage forms such as pills, tablets, capsules, gel capsules, solids, etc. A unit dose is an amount of the ingestible substance that is administered to a patient in a single dose.

The compartments 14, 16, 18, 20, 22, 24, 26, 28 are organized as a series of cavities arranged about a central region 32 of the body 12 that in the representative embodiment are triangular is cross-section (i.e., wedge-shaped). The compartments 14, 16, 18, 20, 22, 24, 26, 28 are displaced in a radial direction slightly outward from central region 32 toward an outer perimeter 33 of the body 12. The body 12 includes a plurality of corners 34, 36, 38, 40 that are modified with a pattern of surface-area reducing features, generally indicated by reference numeral 42, that consist of non-planar structures formed into the material of the body 12. The compartments 14, 16, 18, 20, 22, 24, 26, 28 are encircled by a polygonal shoulder 44, which is inscribed inside the outer perimeter 33 of body 12. Strips 46, which extend radially from the central region 32 to the shoulder 44, are present between adjacent pairs of the compartments 14, 16, 18, 20, 22, 24, 26, 28. A centerline of each of the strips 46, if extended to reach a center 45 of the central region 32, may intersect at the center 45. The shoulder 44 is disposed between the compartments 14, 16, 18, 20, 22, 24, 26, 28 and the outer perimeter 33 of the body 12. The corners 34, 36, 38, 40 are disposed between shoulder 44 and the outer perimeter 33 of the body 12.

The surfaces of the central region 32, shoulder 44, and strips 46 are disposed in a common plane collectively defining a surface 48 of the body 12. The surface 48 defined by the region 32, shoulder 44, and strips 46 is free of score lines, lines of weakening, perforated seams, and the like. This structural omission is permitted because the individual compartments 14, 16, 18, 20, 22, 24, 26, 28 are not intended to be severed from the body 12.

Because of the presence of the surface-area reducing features 42, a fraction of the surface area of the body 12 in each of the corners 34, 36, 38, 40 is likewise contained in the plane of surface 48 and another fraction of the surface area of corners 34, 36, 38, 40 is not contained in the plane of surface 48. The effective reduction in surface area in the corners 34, 36, 38, 40 from the presence of the surface-area reducing features 42 functions to reduce the adhesion of the cover 30 to the body 12 at the corners 34, 36, 38, 40. The reduced adhesion permits the portion of the cover 30 overlying each of the corners 34, 36, 38, 40 to be readily detached and lifted to form a corner pull tab 39 (FIG. 7) without immediately compromising the stronger adhesive bond between the rest of the cover 30 and the adjacent portion of the shoulder 44. In an alternative embodiment, fewer than all of the corners 34, 36, 38, 40 may include the surface-area reducing features 42.

The body 12 of the packaging 10 includes a surface 49 that is opposite to surface 48 and that mirrors surface 48 with the exception of the absence of the surface-area reducing features 42. The surfaces 48, 49 converge at an edge extending about the outer perimeter 33 of the body 12. The distance between the surfaces 48, 49 defines the thickness of the body 12, which is selected to lend a targeted degree of rigidity or semi-rigidity to the body 12.

As best shown in FIG. 1B, the compartments 14, 16, 18, 20, 22, 24, 26, 28 have a circular arrangement of positions or locations on the body 12 and are arranged about the circumference of a reference circle 55. Specifically, a reference point on each of the compartments 14, 16, 18, 20, 22, 24, 26, 28 or arc associated with each of the compartments 14, 16, 18, 20, 22, 24, 26, 28 may be arranged on the circumference of the reference circle 55. A center of the reference circle 55 may coincide with the center 45 of region 32 or, alternatively, with another point in region 32 of the body 12. The reference point or arc may be a nominally equivalent location on each of the compartments 14, 16, 18, 20, 22, 24, 26, 28. In the representative embodiment, the reference point on the reference circle 55 for each of the compartments 14, 16, 18, 20, 22, 24, 26, 28 is a respective position where the corner 60 (FIG. 1A) intersects the edge 65 (FIG. 1A) so that all corners 60 are equidistantly spaced from the center of the reference circle 55 with the same radius. However, other alternative reference arcs or points (e.g., the centroid to the opening 58 (FIG. 1A) associated with each of the compartments 14, 16, 18, 20, 22, 24, 26, 28) may be selected such that the diameter of the reference circle 55 is increased. One or more of the compartments 14, 16, 18, 20, 22, 24, 26, 28 may have a different radial location relative to the center of the reference circle 55 so long as the circular arrangement is maintained.

Generally, the reference circle 55 characterizing the circular arrangement may be divided into a plurality of sectors. Each of the compartments 14, 16, 18, 20, 22, 24, 26, 28 may be located within a unique sector characterized by a central angle having the center of the reference circle 55 as a vertex. The sides bounding the central angle for each of the compartments 14, 16, 18, 20, 22, 24, 26, 28 may extend through an adjacent pair of the strips 46. In one embodiment, the central angle for each of the unique sectors may be equal (e.g., 45°) so that the compartments 14, 16, 18, 20, 22, 24, 26, 28 are uniformly spaced and distributed in the circular arrangement.

From a perspective normal to the surface 48, the outer perimeter 33 of the body 12 may have a rectangular geometrical shape or, in a specific embodiment, may be square with side edges at the outer perimeter 33 of approximately equal length. In one embodiment, the body 12 may have a square geometrical shape with side edges measuring approximately 4 inches in length. This compact sizing permits the patient or caregiver to conveniently insert the assembled and filled packaging 10 into most shirt or blouse pockets.

The body 12 of the packaging 10 may include an indexing feature 51 in the representative form of a blind, hollow post that is disposed in the vicinity of corner 34 in the representative embodiment. Alternatively, the indexing feature 51 may be located in one of the other corners 36, 38, 40. The indexing feature 51 projects away from the plane of surface 48 in the same direction as the compartments 14, 16, 18, 20, 22, 24, 26, 28. The indexing feature 51 may be utilized to rotationally orient the body 12, for example, relative to tooling used to hold the packaging 10 for filling with the oral medications 25. As a specific example, the body 12 of series of packagings 10 may be rotationally oriented such that the compartment 14 is consistently positioned at a known location. In this manner, the angular orientation of multiple different packagings 10 can be reproducibly established for positioning the compartments 14, 16, 18, 20, 22, 24, 26, 28 at known and fixed positions during a filling operation.

As best shown in FIG. 1A, the compartment 14, which is representative of the compartments 14, 16, 18, 20, 22, 24, 26, 28, includes a bottom wall 50 and side walls 52, 54, 56 that project from the surface 48 toward the bottom wall 50. Side wall 52 physically joins or connects with side wall 54 at a corner 60, side wall 56 physically joins or connects with side wall 52 at a corner 62, and side wall 56 physically joins or connects with side wall 54 at a corner 64. Similarly, the side walls 52, 54, 56 join the bottom wall 50 along respective corners. Side walls 52, 54 extend parallel to the strips 46 toward the outer perimeter 33 of the body 12. Side wall 52 and side wall 54 may have approximately equal lengths and each of the side walls 52, 54 may be longer than side wall 56.

The bottom wall 50 and side walls 52, 54, 56 of the compartment 14 have an interior surface 63 that contacts the oral medication 25 placed into compartment 14 and an exterior surface 69 separated from the oral medication 25 by the thickness of the walls 50, 52, 54, 56. The interior surface 63, which joins surface 48 at an edge 65, is continuous across the edge 65 with surface 48. Edge 65 is bounded by the central region 32 on the inner radius relative to center 45 and the shoulder 44 on the outer radius, and is circumferentially bounded by an adjacent pair of strips 46. The exterior surface 69, which joins surface 49, is continuous with surface 49. The interior surface 63 of compartment 14 is recessed relative to the plane of surface 48 and the exterior surface 69 of compartment 14 projects away from the plane of surface 49.

The corners 60, 62, 64 are inside corners on surface 63 and outside corners on surface 69. Corner 60 is located closer to the central region 32 than corners 62, 64. Corner 60 is separated from corner 62 by the length of the side wall 52 and is separated from corner 64 by the length of the side wall 54. Corners 62, 64 are located more proximate to the outer perimeter 33 than corner 60 and are nominally distanced by the length of the side walls 54, 56 from corner 60. Corner 60 is characterized by an included or interior angle between the side walls 52, 54 of, for example, 45°. The interior or included angles of the other corners 62, 64 may be approximately equal. When viewed from a perspective normal to the bottom wall 50, the side walls 52, 54, 56 of the compartment 14 have a triangular arrangement and the opening 58 is characterized by a triangular geometrical shape.

The open space inside the walls 50, 52, 54, 56 is accessed through an opening 58 defined in the plane of surface 48 and peripherally bounded by edge 65. The oral medications 25 are inserted and removed from the body 12 through the openings 58. The opening 58 has a cross-sectional area assessed in the plane of surface 48 and the bottom wall 50 has a surface area that is slightly smaller than the cross-sectional area of the opening 58. To accommodate the difference in areas, the corners 60, 62, 64 taper in width in a direction from surface 48 toward bottom wall 50.

The width of the compartment 14, which is measured as a distance or separation between the respective interior surfaces of the side walls 52, 54, narrows in a direction from corners 62, 64 toward the center 45 of the region 32 with the minimum width occurring near the corner 60. In one embodiment, the width of the compartment 14 may monotonically decrease with increasing distance from corner 60. Compartment 14 includes a depth that is measured from the plane of surface 48 to the plane of the interior surface of the bottom wall 50. In one embodiment, the depth of the compartment 14 may be uniform across the surface area in the plane of the interior surface of the bottom wall 50. The depth and width of the compartment 14 are selected to receive and hold oral medications 25 of multiple different sizes and shapes. In various embodiments, the depth of the compartment 14 may range from thirteen (13) to seventeen (17) millimeters and the maximum width of the compartment 14 may range from twenty nine (29) millimeters to thirty three (33) millimeters.

Side wall 56 may include a denesting feature 66 represented by a small ridge that projects into the compartment 14 from side wall 56. Before use, the bodies 12 of multiple packagings 10 may be stacked with the compartments 14, 16, 18, 20, 22, 24, 26, 28 nested (i.e., fit inside each other). The denesting feature 66 functions to prevent the bodies 12 from tightly nesting so that they are difficult to separate and singulate from the stack. In one embodiment, the side wall 56 of each of the compartments 14, 16, 18, 20, 22, 24, 26, 28 may include the denesting feature 66. Alternatively, the denesting feature 66 may be provided on the side wall 56 of fewer than all of the compartments 14, 16, 18, 20, 22, 24, 26, 28. The denesting feature 66 is typically formed when the body 12 is formed and may represent a feature of the mold used to form body 12.

With renewed reference to FIGS. 1 and 2, the compartments 14, 16, 18, 20, 22, 24, 26, 28 may be marked with indicia 70 used to individually identify the compartments 14, 16, 18, 20, 22, 24, 26, 28. In the representative embodiment, each indicium 70 is a unique numerical digit or positive integer. More specifically, the indicia 70 of the representative embodiment are Arabic numerals ranging in value from one (1) to a number equal to the number of compartments 14, 16, 18, 20, 22, 24, 26, 28 that, in the representative embodiment, is eight (8) compartments. In the representative embodiment, the value of the indicia 70 increments in a clockwise direction when surface 49 and the exterior surface 69 of compartments 14, 16, 18, 20, 22, 24, 26, 28 is oriented to face the observer. However, the embodiments of the invention are not so limited as the indicia value may increment in a counterclockwise direction from this viewing perspective. Other labeling schemes can be used for the indicia 70 in order to individually and uniquely identify the compartments 14, 16, 18, 20, 22, 24, 26, 28 with different alphanumeric characters.

In the representative embodiment, each indicium 70 is legible from the exterior of the packaging 10. The orientation of the characters comprising indicia 70 may be chosen so that the indicia 70 are non-reversed when viewed from the exterior surface 69 of the bottom wall 50 of compartments 14, 16, 18, 20, 22, 24, 26, 28. Because the indicia 70 for the different compartments 14, 16, 18, 20, 22, 24, 26, 28 are unique, the compartments 14, 16, 18, 20, 22, 24, 26, 28 can be visually identified and distinguished relative to each other.

The indicia 70 may be physically formed into the material of the body 12 as permanent features that are not removable from the body 12. This type of indicia 70 may be formed when the body 12 is formed and may be present as reverse features in the mold used to form body 12. The indicia 70 may be raised relative to the plane of the interior surface 63 of the bottom wall 50 or may be recessed relative to the plane of the exterior surface 69 of the bottom wall 50. The dimensions (e.g., line width, character height) of the indicia 70 are selected to promote legibility. Alternatively, the indicia 70 may be applied as stickers or labels to one of the surfaces 63, 69, preferably to the exterior surface 69, of the compartments 14, 16, 18, 20, 22, 24, 26, 28 or printed onto the surfaces 63, 69, preferably onto the exterior surface 69.

The body 12 of the packaging 10 may be formed from a thin sheet composed of a polymer, such as polyvinyl chloride (PVC). The polymer comprising the thin sheet may be opaque, translucent, or transparent with regard to light transmission. The sheet may be molded or otherwise processed in a conventional manner to produce the compartments 14, 16, 18, 20, 22, 24, 26, 28. For example, the body 12 may be fabricated by a thermoforming process in which a thin-gauge sheet of thermoplastic polymer is pre-heated to a pliable forming temperature, formed to the specific shape in a mold, cooled to regain its rigidity, and trimmed to shape. The thin-gauge sheet used in the thermoforming process to form body 12 may be supplied to the thermoforming process from a roll of stock material.

Figure 4A:
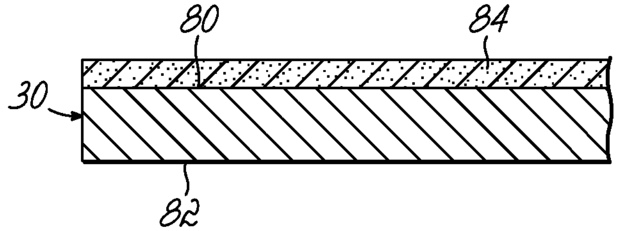
FIG. 4A is a cross-sectional view taken generally along line 4A-4A in FIG. 4.
Figure 3:
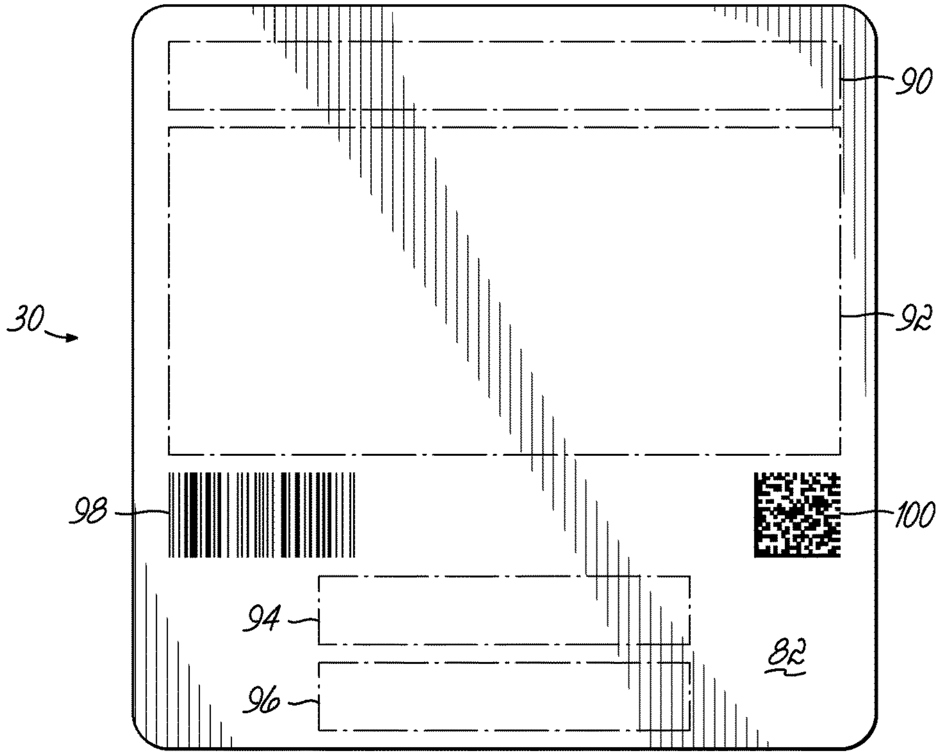
FIG. 3 is a top view of a top surface of the cover for the packaging shown in FIGS. 1 and 2.
Figure 4:
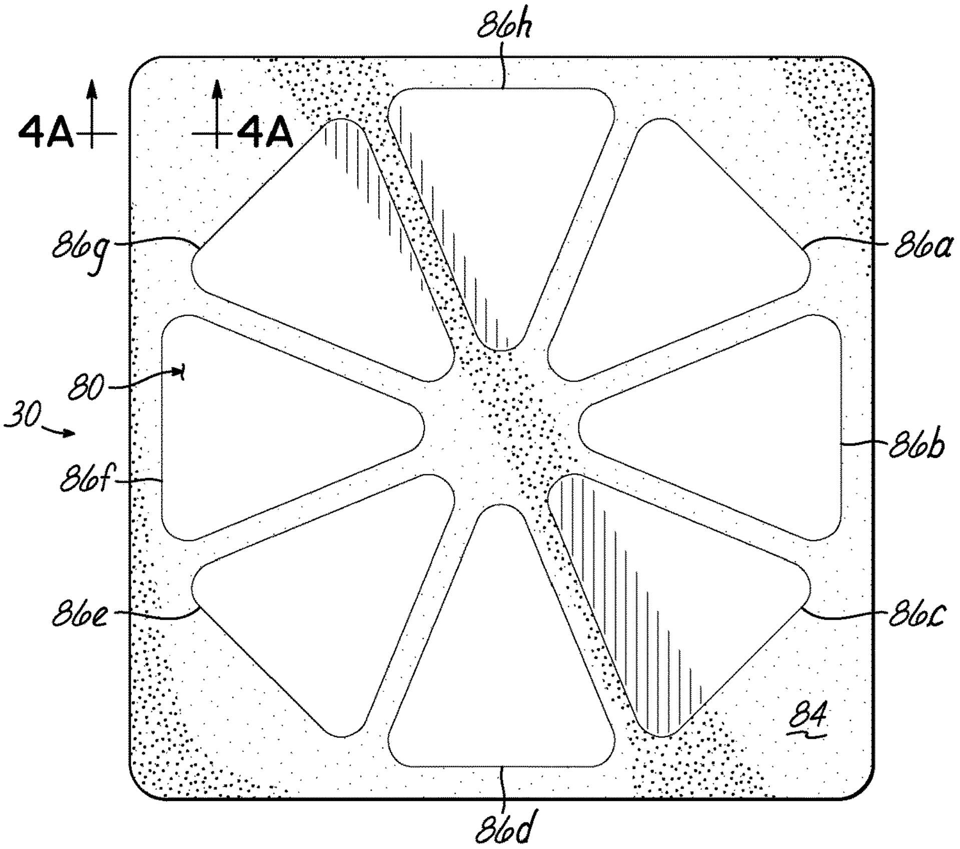
FIG. 4 is a bottom view of a bottom surface of the cover of FIG. 3.

With reference to FIGS. 3, 4, and 4A, the cover 30 has approximately the same geometrical shape and dimensions as the body 12 of the packaging 10. The cover 30 has one surface 80 that is attached to the body 12 and a second surface 82 that is not attached to the body 12. In particular, surface 80 of the cover 30 is attached to the surface 48 of the body 12 to seal the compartments 14, 16, 18, 20, 22, 24, 26, 28 and to thereby seal the oral medications 25 in the compartments 14, 16, 18, 20, 22, 24, 26, 28. When the cover 30 is attached to the body 12, the side walls 52, 54, 56 project in a direction away from the surface 80 of the cover 30. When the packaging 10 is assembled, surface 82 is visible to an observer and exposed to environmental elements.

Surface 80 of cover 30 may include a coating 84, as best shown in FIG. 4A, that is used to releasably attach the cover 30 to the shoulder 44, strips 46, and central region 32 of the body 12. Surface 82 of the cover 30 is separated from the coating 84 on surface 80 by the thickness of the cover 30. The second surface 82 is nominally free of the substance in the coating 84, other than negligible amounts of stray residue that may be present as a result of the application process applying the coating 84 to surface 80. Among other variables, the width of shoulder 44, the width of strips 46, and the area of central region 32 in the plane of surface 48 may be adjusted to set a level of adhesion and thereby set the resistance against removal of cover 30.

In one embodiment, the coating 84 may be comprised of a pressure sensitive adhesive that is permanently tacky and is typically used in conjunction with a release paper covering. Alternatively, the coating 84 may be comprised of a cold seal adhesive that only adheres to itself; however, this embodiment may require also coating the surface 48 of the body 12 with the same of a compatible cold seal adhesive to provide an adhesive bond with the cold seal adhesive residing on surface 80. In another alternative embodiment, the substance in the coating 84 on surface 80 may be a heat activated adhesive that must be heated for a defined period of time at an elevated temperature and/or in the presence of applied pressure in order to achieve final bonding strength.

The cover 30 of the packaging 10 may be formed from a thin sheet comprised of a composite material, such as a blend of paper with a polymer, such as polypropylene. The cover 30 is formed from a material with properties, such as thickness and stiffness, that provide rupture resistance to pressure indirectly applied through the material of the body 12 to one of the oral medications 25 in an attempt to push the oral medication 25 through the cover 30. Preferably, the cover 30 is not rupturable over a wide range of applied forces applied to the oral medication inside of the compartments 14, 16, 18, 20, 22, 24, 26, 28. The single sheet design of the cover 30 differs from blister packs that include an impenetrable (e.g., paper) sheet and a penetrable (e.g., foil) sheet disposed between the blister body and the impenetrable sheet, and in which the impenetrable sheet is removed to reveal the penetrable sheet in preparation of forcing a medication to penetrate through the penetrable sheet.

In an alternative embodiment, the cover 30 of the packaging 30 may also comprise a peel foil and a heat-seal coating for the peel foil that includes two distinct laminated layers that are designed to separate from each other when peeled from the body 12. When the card is sealed, an outermost layer of the heat-seal coating is permanently sealed to the body 12. When the peel foil is peeled from the body 12, an innermost seal layer of the heat-seal coating peels to release the peel foil and to uncover the compartments 14, 16, 18, 20, 22, 24, 26, 28, while the permanently-sealed portion of the outermost layer is retained on the surface 48 of body 12.

The cover 30 is free of score lines, lines of weakening, perforated seams, and the like, which strengthens the resistance to cover punch-through in response to a force applied to the oral medication 25. The cover 30 may be formed from roll stock to which the coating 84 is an adhesive (e.g., pressure sensitive adhesive) pre-applied as a coating across the full surface area of surface 80. In one embodiment, the roll stock may be pressure sensitive label stock with the coating 84 and a removable liner or release paper (not shown) covering the coating 84.

The coating 84 may be modified to selectively reduce the adhesiveness of the constituent substance or material. Specifically, if the coating 84 is comprised of an adhesive, a deadening material, such as a varnish, may be applied (e.g., by printing) over the entire surface area of surface 80. The deadening material functions to adjust the adhesiveness of the coating 84 and the adhesion of cover 30 to the surface 48 of body 12. This adjustment mechanism may be used to control the force that must be applied to separate the cover 30 from the body 12, which may be a concern for the elderly who may exhibit a reduced physical strength.

In the representative embodiment, the deadening material may be patterned to form regions 86*a-h* in the coating 84 that match the geometrical shape (e.g., triangular shape) and pattern of the openings 58 to the compartments 14, 16, 18, 20, 22, 24, 26, 28 of the body 12. The regions 86*a-h* preferably exhibit either no or negligible adhesiveness upon contact with the medications 25. The regions 86*a-h* are also provided in a circular arrangement on a center that matches the circular arrangement of the compartments 14, 16, 18, 20, 22, 24, 26, 28. The coating 84 of the cover 30 therefore exhibits different levels of adhesiveness at different positions across the surface area of surface 82. When the cover 30 is joined to the body 12 (FIGS. 5, 6), the regions 86*a-h* are aligned spatially with the locations of the opening 58 to each of the compartments 14, 16, 18, 20, 22, 24, 26, 28 of the body 12. In an alternative embodiment, the dispensing of the material constituting the coating 84 may be controlled such that the constituent material is not applied to surface 80 of cover 30 in regions 86*a-h*.

Figure 4B:
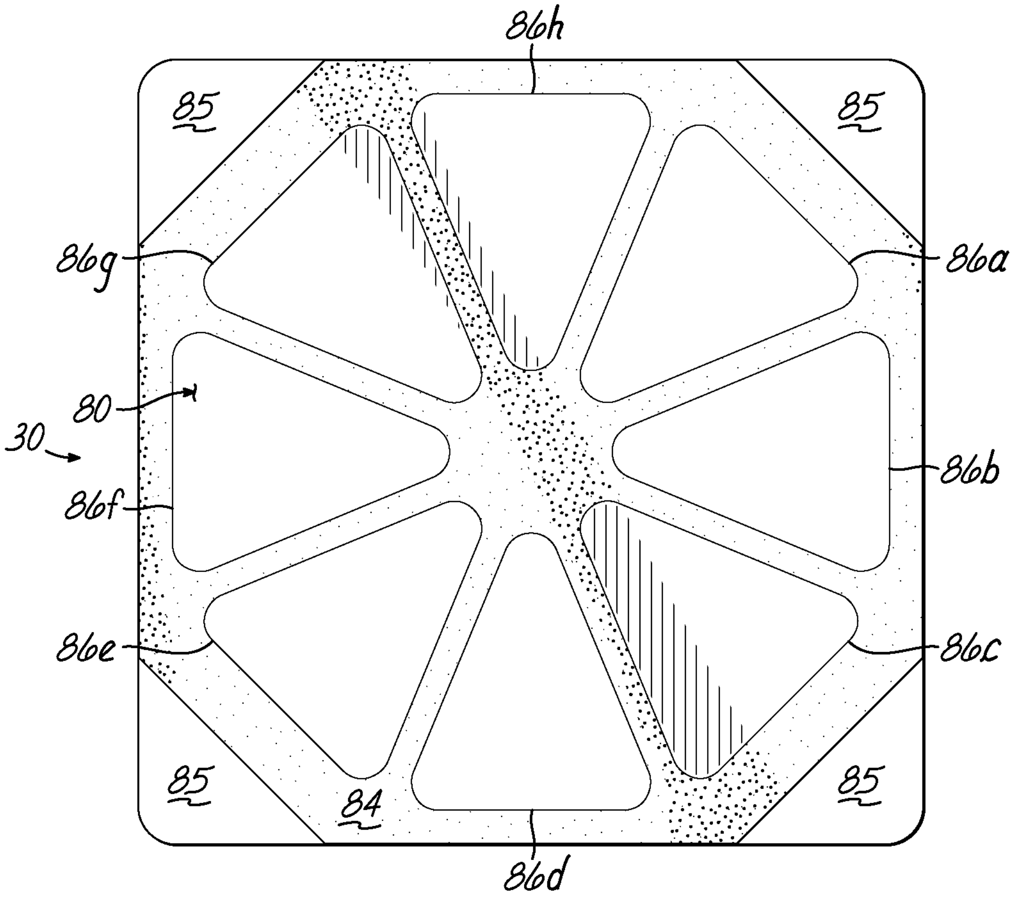
FIG. 4B is a bottom view similar to FIG. 4 in which triangular sections of release paper reside on the corners of the cover in accordance with an alternative embodiment.

Alternatively and as shown in FIG. 4B, if a release paper is present, the release paper may be die cut while resident on the cover 30 to define sections 85. The sections 85 are permitted to remain adhered to the coating 84 on the cover 30 after the remainder of the release paper is removed in preparation of attaching the cover 30 to the body 12. In the representative embodiment, the sections 85 have a triangular shape. The sections 85 function to block the coating 84 from adhering to the corners 34, 36, 38, 40 of the body 12 when the cover 30 is attached to the body 12. As a result, the sections 85 of the cover 30 may operate as pull tabs 39. In the representative embodiment, each corner of the cover 30 includes one of the sections 85 of release paper. However, in an alternative embodiment, the sections 85 may be applied on fewer than all of the corners of the cover 30. For example, only two corners may include one of the sections 85. The sections 85 of release paper remain attached to the cover 30 when the cover 30 is at least partially detached to release the oral medications 25 for administration from the packaging 10 to a patient.

Sections (not shown) of release paper similar to sections 85 may be die cut in locations correlated with the location of the openings 58 to the compartments 14, 16, 18, 20, 22, 24, 26, 28 of the body 12. In one embodiment, these sections of release paper would match the shape and pattern of the openings 58 to the compartments 14, 16, 18, 20, 22, 24, 26, 28 and therefore have an appearance similar or identical to regions 86*a-h*. The presence of the release paper sections 85 would eliminate the need to completely deaden the coating 84 in regions 86*a-h* or pattern the coating 84 so that the constituent substance is absent in regions 86*a-h* because the sections of release paper would eliminate any adhesion of the medications 25 with the coating 84. The presence of the release paper sections 85 may also eliminate the need for the surface-area reducing features 42. The sections of release paper remain attached to the cover 30 and are removed from their respective locations over the openings 58 when the cover 30 is at least partially detached to release the oral medications 25 for administration from the packaging 10 to a patient.

Surface 82 of cover 30 may include information-containing data fields 90, 92, 94, 96 and machine-readable markings 98, 100. The data fields 90, 92, 94, 96 and machine-readable markings 98, 100 are customized to be specific to the patient to whom the oral medications 25 are prescribed and, hence, may contain information pertinent to the packaging 10, its contents of oral medications 25, and the patient. Because the cover 30 is intact when removed to expose the openings 58, the data fields 90, 92, 94, 96 and machine-readable markings 98, 100 can be presented on the surface 82 without consideration of obscuring the information by partial removal of the cover 30.

Each of the data fields 90, 92, 94, 96 may contain human-readable text such as simple text with any number and combination of alphanumeric characters, as well as optional symbols, grammatically formatted and arranged to be parsed and understood by a human reader and to convey information to the human reader.

The human-readable text in data field 90 may contain information relating to the patient, such as patient name, date of birth, sex, telephone number, and residential street address. This information may be used to verify that the named patient associated with the packaging 10 is correct.

The human-readable text in data field 92 may contain information that relates to the oral medications 25 inside the packaging 10. The information in the data field 92 may include, but is not limited to, compartment number, oral medication name, strength, form, color, shape, and size. In particular, the data field 92 may include entries that correlate an alphanumeric representation of the unique indicia 70 on the body 12 with an alphanumeric identifier (e.g., oral medication name) for each of the oral medications 25 held the compartments 14, 16, 18, 20, 22, 24, 26, 28.

The human-readable text in data field 94 may contain information relating to the pharmacist or facility that filled the prescriptions. The human-readable text in data field 96 may contain time indicia, such as the day of the week, the calendar date, and a time of the day, that indicates a designated date and time (i.e., medication pass) at which the oral medications 25 (FIG. 8) in the packaging 10 are to be administered to the patient identified in data field 90.

The machine-readable markings 98, 100 may comprise a one-dimensional bar code or a two-dimensional bar code containing a light background and dark informational elements arranged in a pattern on the light background. The machine-readable markings 98, 100 may be utilized by a machine, such as a smartphone, a vision system, or a bar code reader, equipped with suitable electronics capable of reading, imaging, or scanning the markings 98, 100 and translating the resulting data into a digital form that is usable by the machine to track and/or verify each individual packaging 10. The machine-readable markings 98, 100 may encode information selected from one or more of the data fields 90, 92, 94, 96.

The data fields 90, 92, 94, 96 and machine-readable markings 98, 100 may be printed using conventional printing techniques or otherwise applied onto the surface 82. For example, the data fields may be directly printed with a conventional printer (e.g., label printer) onto the surface 82 before the cover 30 is assembled with the body 12.

Figure 5:
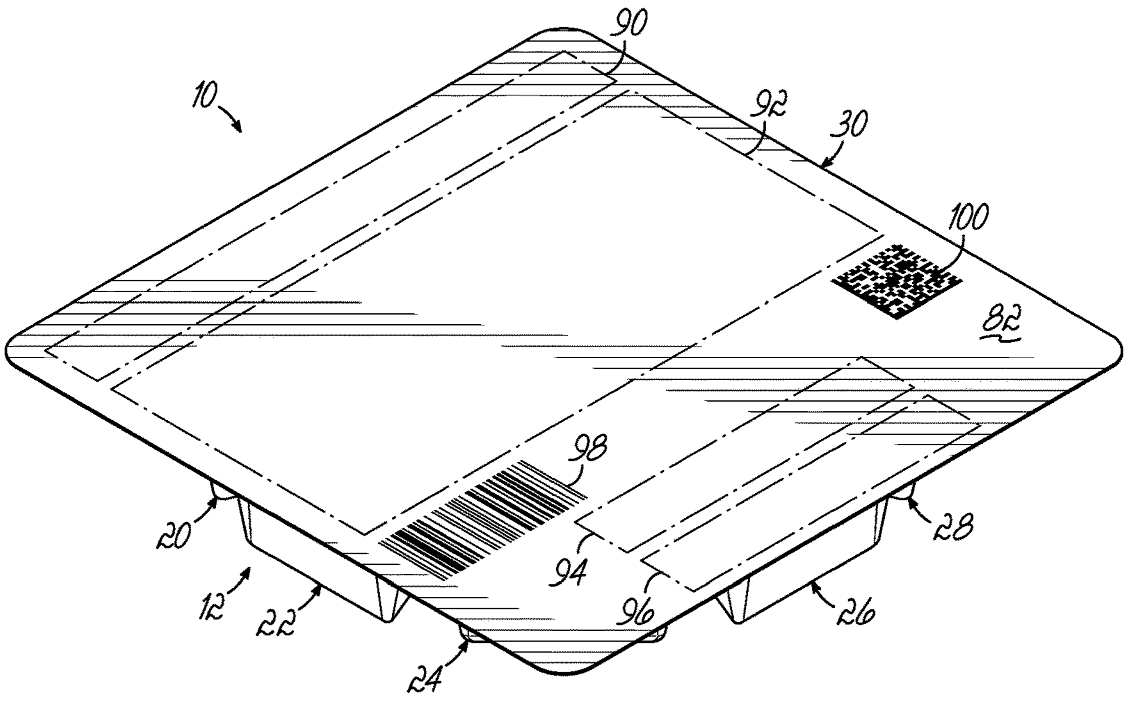
FIG. 5 is a top perspective view similar to FIG. 1 in which the cover and body of the packaging are attached together.
Figure 6:
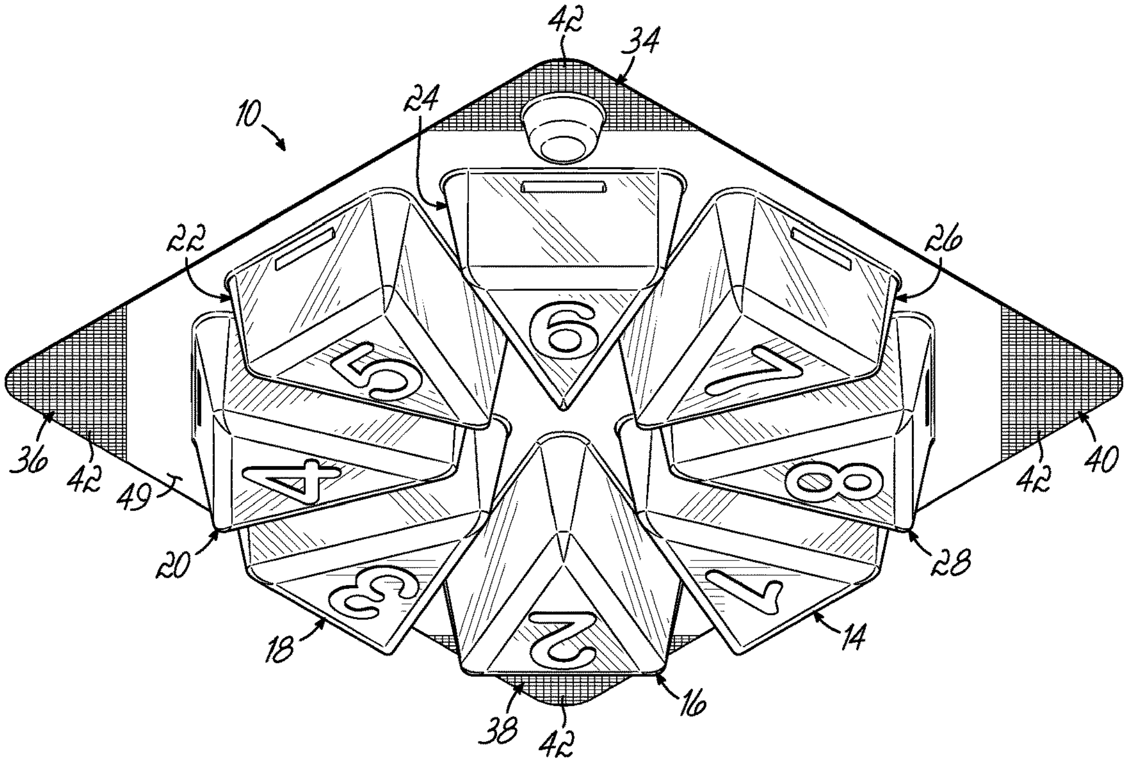
FIG. 6 is a bottom perspective view similar to FIG. 2 in which the cover and body of the packaging are attached together.

With reference to FIGS. 5 and 6, the cover 30 is assembled with the body 12 to provide the packaging 10 that contains the medications 25 (FIG. 8). The assembly securely holds the oral medications 25 for distribution to a patient and stores the oral medications 25 until administered to the patient.

In use, one or more of the compartments 14, 16, 18, 20, 22, 24, 26, 28 of the body 12 are filled with the requisite oral medications 25 (FIG. 8) at a pharmacy or other type of filling facility. Specifically, a single unit dose of each oral medication 25 can be inserted into each of the compartments 14, 16, 18, 20, 22, 24, 26, 28 through the respective opening 58 and reside therein as best shown in FIG. 8. In one embodiment, each oral medication 25 inserted into one of the compartments 14, 16, 18, 20, 22, 24, 26, 28 is a unit dose that is unique from the other unit doses. In an alternative embodiment, two or more of the compartments 14, 16, 18, 20, 22, 24, 26, 28 may receive a unit dose of the same oral medication 25. Alternatively, one or more of the compartments 14, 16, 18, 20, 22, 24, 26, 28 may contain multiple unit doses of the same type of oral medication 25. It is understood that one or more of the compartments 14, 16, 18, 20, 22, 24, 26, 28 in the body 12 may remain unfilled and empty in the sealed condition. Each of the oral medications 25 may differ from the other oral medications 25 or, alternatively, two or more of the compartments 14, 16, 18, 20, 22, 24, 26, 28 may contain the same type of oral medication.

After the compartments 14, 16, 18, 20, 22, 24, 26, 28 are populated with the oral medications 25, the cover 30 is joined to the body 12, as best shown in FIGS. 5 and 6. The attachment (e.g., an adhesive bond) is established by the coating 84 disposed between the surface 48 of the body 12 and the surface 80 of the cover 30. In the sealed condition, the packaging 10 is sealed closed against the entry of environmental contaminants and against the loss of the oral medications 25. In the sealed condition, the compartments 14, 16, 18, 20, 22, 24, 26, 28 are isolated from each other so that the oral medications 25 are confined and segregated to prevent commingling among the different oral medications 25. The isolation of the oral medications 25 contrasts with conventional packages in which the oral medications 25 are not segregated and may commingle together.

The packaging 10 can be transferred from a medication filling facility to another location (e.g., delivered to a patient at the patient's residence or domicile) with the oral medications 25 secured inside the covered compartments 14, 16, 18, 20, 22, 24, 26, 28. The oral medications 25 are stored in each packaging 10 until administered to a patient.

At the location of the patient and in advance of oral consumption, the oral medications 25 can be removed from the compartments 14, 16, 18, 20, 22, 24, 26, 28 through the same openings 58 used for filling. To that end, the packaging 10 is made available to a patient for whom the oral medications 25 contained in the packaging 10 were prescribed or by a caregiver for the patient. The patient or patient caregiver may grasp the packaging 10 in one hand with a finger inserted from below into the space between the compartments 14, 16, 18, 20, 22, 24, 26, 28 of the body 12 and the palm of the hand contacting the surface 69 of at least some of the compartments 14, 16, 18, 20, 22, 24, 26, 28. With the opposite hand, the patient or patient caregiver lifts the portion of the cover 30 bonded to one of the corners 34, 36, 38, 40, which exhibits reduced adhesion due to the presence of the surface-area reducing features 42 or the release paper sections 85, to form the corner pull tab 39. The patient may use an object to provide assistance in forming the corner pull tab 39.

Figure 7:
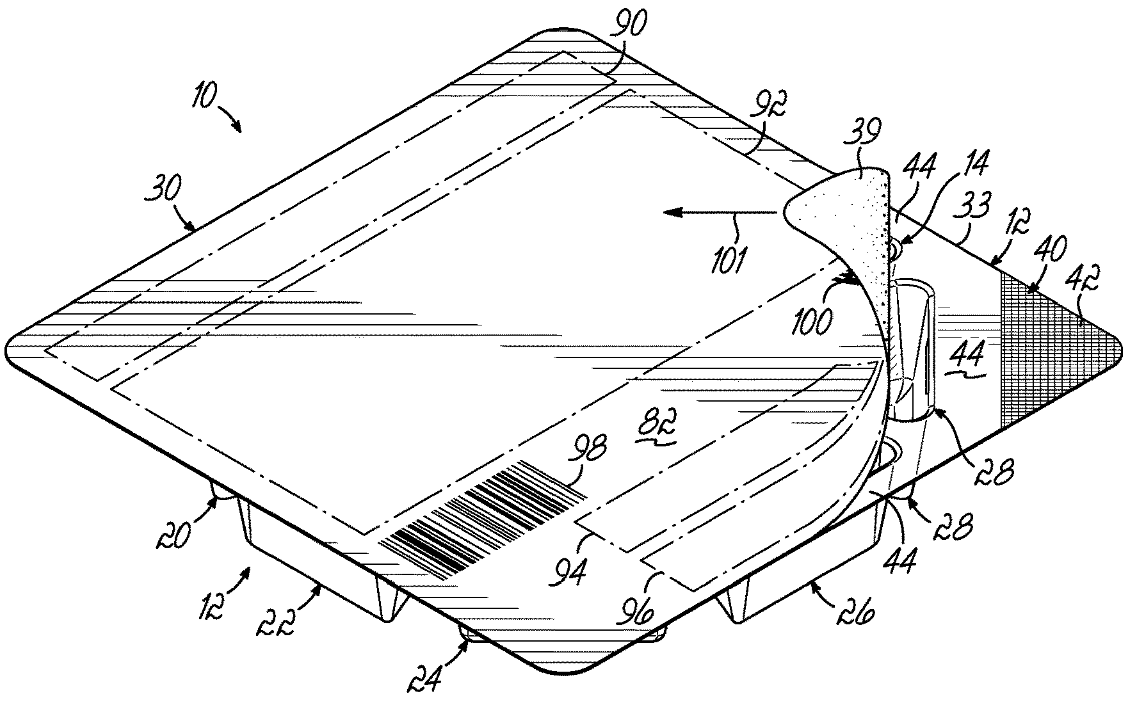
FIG. 7 is a top perspective view of the packaging following the placement of the oral medications into the compartments and the attachment of the cover to the body.

The lifted portion of the cover 30 defines the corner pull tab 39 that the patient or caregiver can grasp and apply a manual force, which is diagrammatically indicated by the single-headed arrow 101 in FIG. 7, to the corner pull tab 39 that peels the cover 30. After peeling is complete, the cover 30 may be only partially detached from the body 12. Alternatively, the detachment may be complete so that the cover 30 is removed intact from the body 12. This senior-friendly mode of opening the packaging 10 eliminates any type of punching action by applying pressure to each oral medication to push the oral medication through the lidding material as found in conventional blister packs.

After the cover 30 is peeled, the opening 58 at the entrance to each of the compartments 14, 16, 18, 20, 22, 24, 26, 28 is revealed, as best shown in FIG. 8. The packaging 10 is then emptied of the oral medications 25. For example, all of the oral medications 25 can be removed from the compartments 14, 16, 18, 20, 22, 24, 26, 28 by manipulating the body 12 with one hand to empty the oral medications 25 into the other hand. The medication removal process contrasts with conventional blister packs that are reused by patients to dispense oral medications 25 at on multiple occasions (e.g., on different days and/or at different times during the same day).

The oral medications 25 are then administered to the patient. The patient or patient caregiver can conveniently dispose of the packaging 10, which is non-reusable.

The consumption of the entire contents (i.e., all of the oral medications 25 in the compartments 14, 16, 18, 20, 22, 24, 26, 28) of the packaging 10 improves compliance because the patient has to exercise only minimal judgment in order to consume the oral medications 25 contained therein. The use of the packaging 10 eliminates potential confusion arising from the complexity of multiple prescriptions and administration instructions.

The packaging 10 is best suited for distributing oral medications 25 that are administered to a patient daily every month as part of long-term, maintenance care. Patients, such as elderly or senior patients, may daily dispense and consume oral medications 25 from the packaging 10 in medication passes at different time points during the day, such as breakfast, lunch, dinner, and bed time (or morning, noon, evening, and night) or at specifically designated times (e.g., 7 a.m., noon, 5 p.m., and 10 p.m.). A patient caregiver may participate in the use of the packaging 10 to dispense the oral medications 25 and the administration of the oral medications 25 to the patient for oral consumption. Each of the oral medications 25 may be administered to the patient by oral consumption once a day (QD), two times a day (BID), three times a day (TID), or four times a day (QID). Certain oral medications 25 should be administered to the patient by oral consumption during a specific medication pass (only at bed time or at breakfast). The number of daily doses and any time-of-day restrictions may be factors used to allocate the oral medications 25 to a specific packaging 10 designated for administration in a particular medication pass. Other types of oral medications that are administered to the patient when needed (PRN) may be supplied in a different type of packaging that permits separate access to each of the individual compartments.

The packaging 10 may be provided to a patient in a non-institutional (e.g., home or residential) setting. In one embodiment, the patient may be identified while in a transitional care facility, such as a hospital, rehabilitation center, or step-down care unit, and solicited to participate in a home/residence distribution service program following discharge from the transitional care facility. The oral medications 25 are prescribed by the patient's physician(s) and are filled by the service program provider with the oversight of a pharmacist. The service program provider is responsible for packaging the oral medications 25 into the packagings 10 and delivering the packagings 10 to the patient's domicile. In another embodiment, the patient may be solicited by direct advertising, by agreement with an organization to which the patient belongs, by agreement with a company that employs or that once employed the patent, etc.

Alternatively, the packagings 10 may be targeted for use by patients while resident in senior housing, such as assisted living facilities (ALF), skilled nursing facility facilities (SNF), and independent living facilities (ILF). At a skilled nursing facility, acute care and rehabilitation services are provided to each patient. Care is typically not provided to patients living at an independent living facility, which has the appearance of a multifamily setting with common meals, entertainment, and active senior life activities. An independent living facility also has the appearance of a multifamily setting but general assistance is provided for daily life activities.

Figure 9:
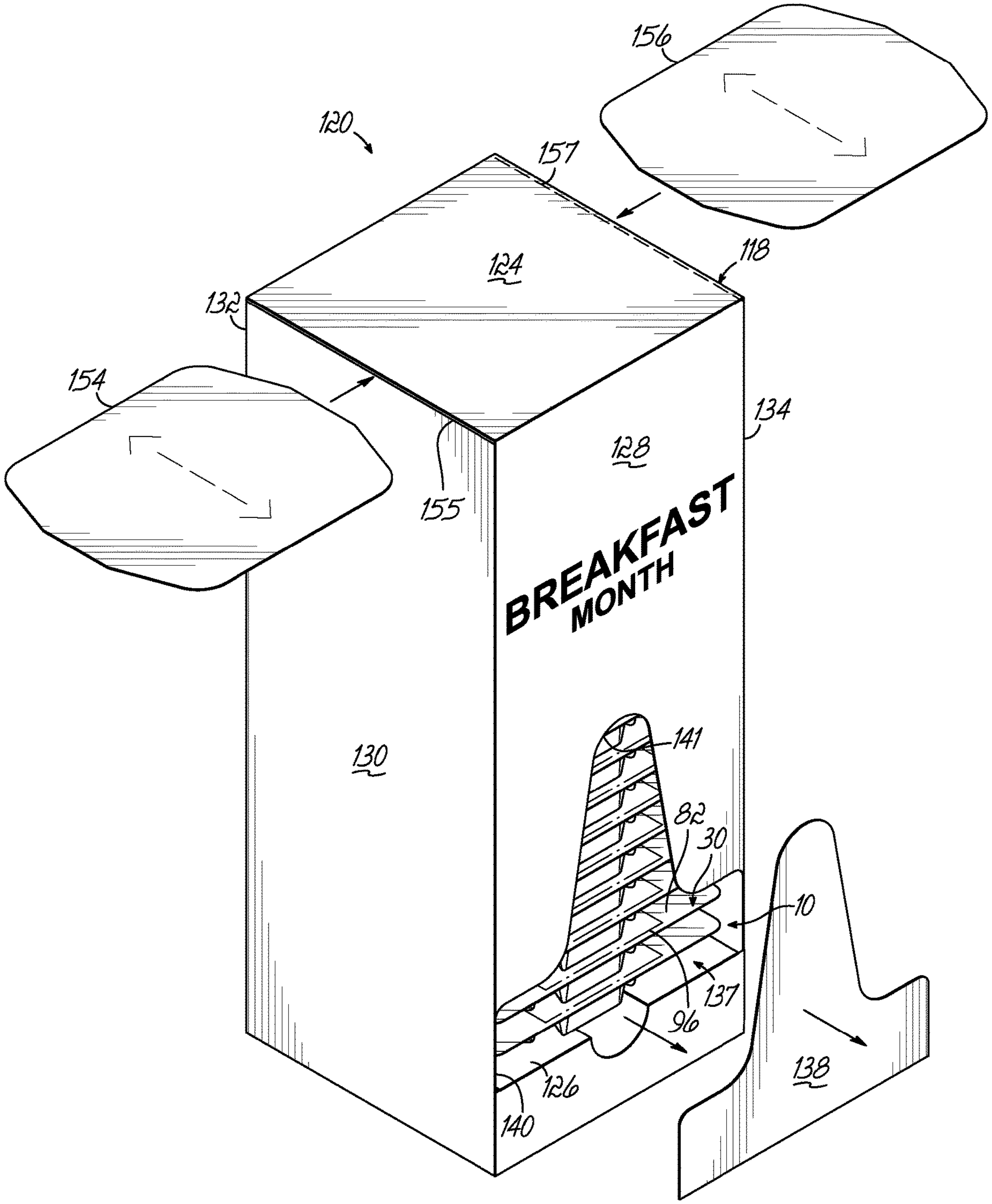
FIG. 9. is a perspective view of a carton that may be used to distribute a group of the packagings of FIGS. 1-8.
Figure 10:
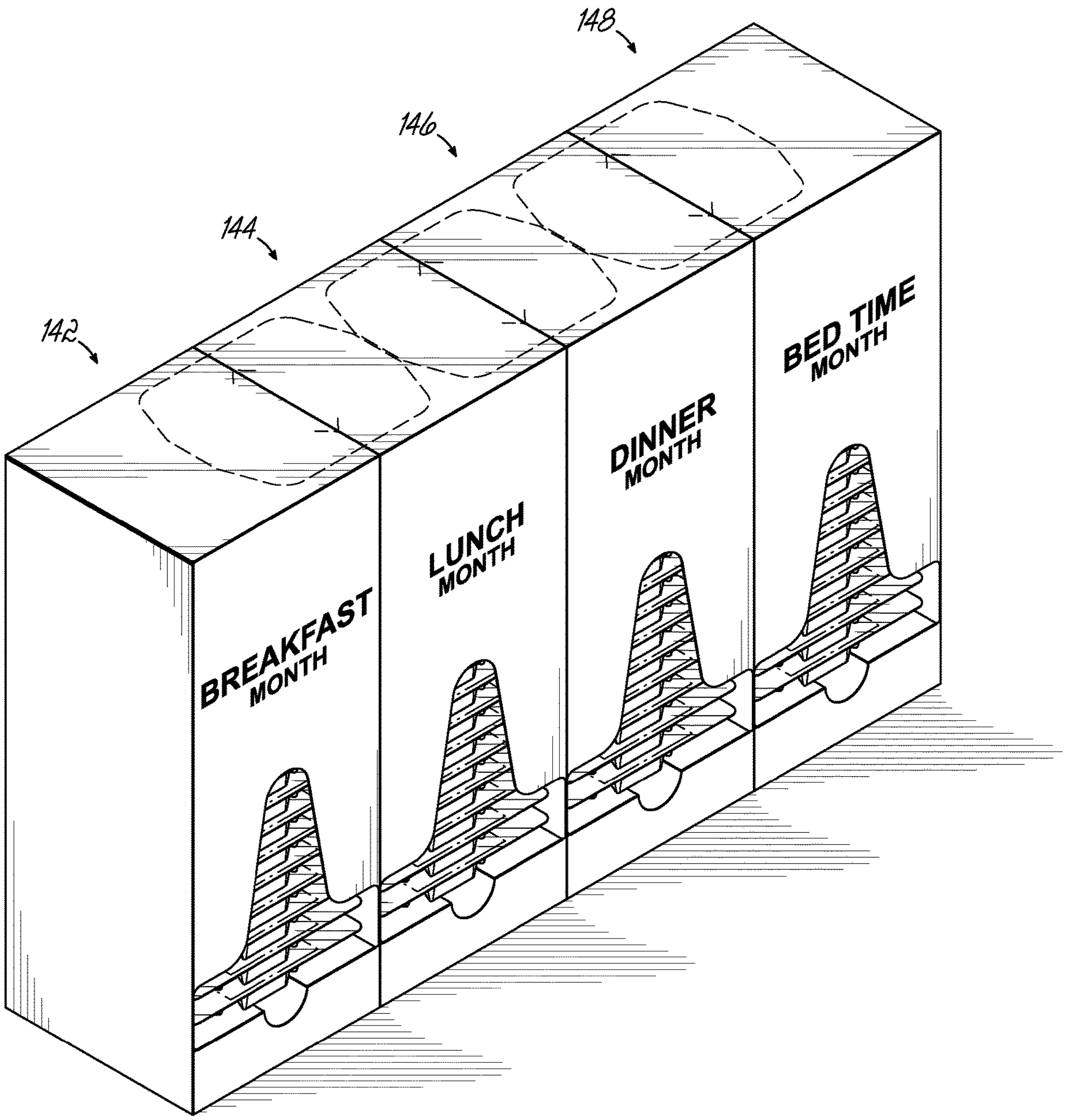
FIG. 10 is a perspective view of a set of cartons each similar to the carton of FIG. 9 and each associated with a different medication pass.
Figure 11:
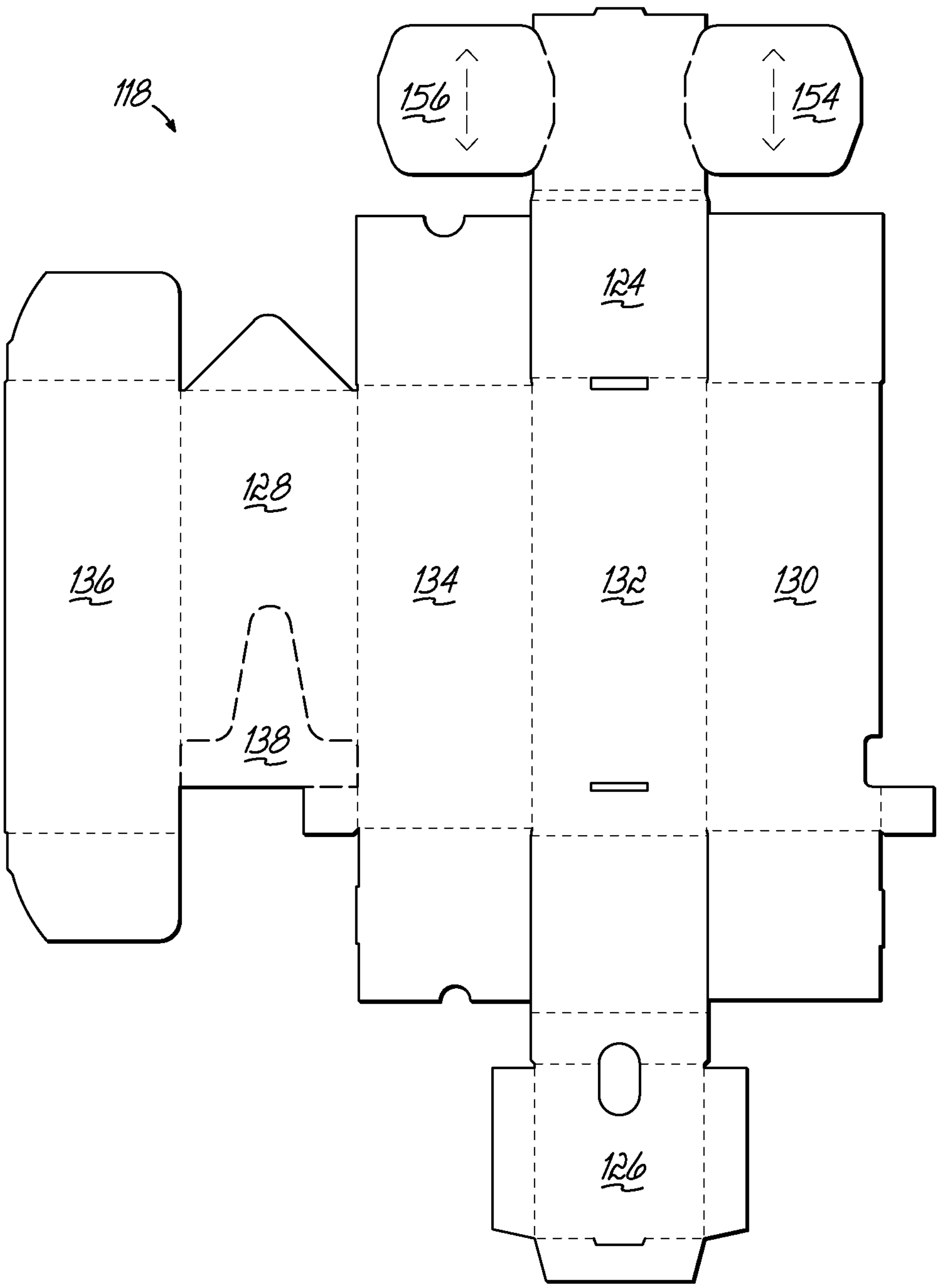
FIG. 11 is a plan view of the carton of FIG. 8 as a blank in an unfolded state before erection and filling with packagings.

With reference to FIGS. 9-11, a group of packagings 10 may be distributed to a patient in a carton 120. For example, a one month or a fifteen (15) day supply of packagings 10 containing medications 25 for a unique medication pass may be placed inside the carton 120 and distributed to the patient for consumption, for example, at the patient's residence.

The carton 120 includes an outer casing 118 with end panels 124, 126 and side panels 128, 130, 132, 134, 136. The panels 124, 126, 128, 130, 132, 134, 136 are joined by various fold lines. The carton 120 is erected by folding a blank (FIG. 11) and securing the carton 120 in the folded shape with in a conventional manner, such as by adhesive bonding. End panel 126 folds to define a small platform that elevates the lowest packaging 10 off of the support surface to ease handling and removal. The carton 120 can be manufactured from a flat sheet of any of the grades or types of paperboard commonly used in folding carton manufacture. The blank used to form the carton 120 may be die cut from a flat sheet of the selected material.

The carton 120 can include instructions or other exteriorly-visible information, such as a month and a time of the day of the medication pass, that are related to the use of the packagings 10 inside the carton 120. The information can, for example, include text and/or graphics, as desired. Furthermore, the carton 120 may include information that is related to a designation (e.g., a trademark or a trade name) of a product source, bar codes, or other artwork. Although the various items of information may be positioned on or in the carton 120 in any conventional way, the information can be printed on an exterior surface of the carton 120.

Multiple packagings 10, which have generally rectangular configuration in the representative embodiment, are placed into the interior space 137 inside the carton 120 with a horizontal orientation relative to a surface supporting the carton 120. The packagings 10 are stacked in a single vertical tower or array within the interior space 137 and may be oriented such that the covers 30 of adjacent packagings 10 are separated from each other by the body 12 of one of the packagings 10. The orientation may be such that the body 12 of each packaging 10 is located vertically between the respective cover 30 and the supporting surface for the carton 120.

A removable slot cover 138 is defined in one of the panels 128 and has a perimeter defined by the perforations of a score line. The slot cover 138 is removed by tearing along the perforations to reveal a slot 140. The slot cover 138 physically blocks the slot 140, after filling, so that the packagings 10 are confined inside the carton 120. The slot 140 provides access to the interior space 136. The slot 140 includes a finger opening 141 that provides access to use fingers, typically the forefinger and thumb, to grasp the lowermost packaging 10. The patient, patient caregiver, or other individual may visualize identifying indicia in at least data field 96 on the surface 82 of cover 30 of each packaging 10 through the slot 140. Packagings 10 are horizontally retrieved in a sequential manner from the bottom of the vertical stack of packagings 10 and through the slot 140 by grasping a side edge of the packaging 10. Panel 126 may define a ramp that lifts the lowermost packaging 10 above the support surface and thereby eases removal from the carton 120. As each individual packaging 10 is withdrawn from the interior space 137 of carton 120, the stack of packagings 10 drops downwardly to reposition another packaging 10 at the lowermost position for subsequent removal from the carton 120. This procedure continues until the carton 120 is emptied of packagings 10.

With reference to FIG. 10 in which like reference numerals refer to like features in FIG. 9 and in an alternative embodiment, packagings 10 may be distributed in a set of multiple cartons 142, 144, 146, 148 each nominally identical to carton 120 (FIG. 9). Each of the cartons 142, 144, 146, 148 may contain or house a set of packagings 10 with contents intended to be administered to the patient at nominally the same designated time on successive days of a month as identified by indicia in data field 96. For example, the cartons 142, 144, 146, 148 may contain respective stacks of packagings 10 sufficient to provide a one-month supply of oral medications 25 for administration at four different daily times (i.e., medication passes) each day in a given calendar month. Alternatively, an additional set of cartons like cartons 142, 144, 146, 148 may be utilized to divide each respective stack of packagings 10 into two or more shorter stacks so that each specific medication pass is contained in two or more cartons. For example, one set of cartons 142, 144, 146, 148 may hold the packagings 10 for days 1-15 and another set of cartons 142, 144, 146, 148 may hold the packagings 10 for days 16-30 in order to distribute a one month supply of packagings 10 to the patient. In the representative embodiment, the cartons 142, 144, 146, 148 may serve medication passes at different time points during the day, such as breakfast, lunch, dinner, and bed time. However, in an alternative embodiment, a smaller number of cartons may be distributed in which packagings 10 are held for different combinations and permutations of medication passes according to the medication needs of the patient. For example, only a pair of the cartons 142, 144 may be filled and distributed that respectively hold a supply of packagings 10 designated for only two different medication passes (e.g., breakfast and dinner). As another example, only one carton 142 may be filled with packagings 10 and distributed to the patient.

The cartons 142, 144, 146, 148 holding the packagings 10 may be delivered or shipped directly to the residential address of the patient each month through a commercial delivery or shipping service. The cartons 142, 144, 146, 148 may be contained inside an outer shipping carton to provide protection during shipment. A patient's prescriptions may be automatically refilled each month by distributing a new group of packagings 10. Additional non-unit dose items, such as injectables, patches, ointments and creams, intravenous therapy bags, etc., may be included in a separate carton shipped along with the cartons 142, 144, 146, 148 to the patient.

The solitary units represented by the cartons 142, 144, 146, 148 may be piecewise assembled together into a unit. The assemblage may be distributed as a unitary structure to the patient. After carton 142 is erected, filled and closed, a connector 154 is inserted into a slot 155 at the top of the carton 142 and another connector 156 is inserted into a slot 157 at the bottom of the carton 142. The connectors 154, 156 may be provided as removable portions of the blank used to form one or more of the cartons 142, 144, 146, 148. Preferably, approximately one half of each of the connectors 154, 156 protrudes from its respective slot at the top and bottom of the carton 142.

After carton 144 is erected, filled and closed, adhesive is applied to the exterior surface of a panel that, when the cartons 142, 144 are juxtaposed in a side-by-side relationship, faces toward the panel of carton 142 with the inserted connectors 154, 156. Preferably, the cartons 142, 144 are oriented such that the respective slots 140 face in the same direction. Carton 144 is guided such that the connectors 154, 156 protruding from carton 142 are inserted the slots at the top and bottom of carton 144, which are similar to slots 155, 157. Carton 144 is pressed against carton 142 in order to adhesively bond the mating panels of the cartons 142, 144 together. The connectors 154, 156 add rigidity to the assemblage and function to securely fasten the cartons 142, 144 against top-to-bottom relative motion and front-to-back relative motion. The adhesive on the mated panels also adds rigidity to the assemblage and functions to securely fasten the cartons 142, 144 against side-to-side relative motion. This process is continued to add additional cartons (e.g., carton 146 and/or carton 148) to complete the assemblage.

Other types of machinable folding cartons may be used to store and distribute the groups of packagings 10. For example, overwrap types of carton or knock-down cartons where either the end flaps or the top and bottom flaps are glued or folded may be used.

The filling of the prescriptions for the oral medications 25 dispensed in the packaging 10 may be supervised and coordinated by an advisor, such as a care coordinator, who operates as a patient interface. The care coordinator may also provide direction and oversight to the patient on all aspects of the acquisition, disposition, handling, storage, and administration of the oral medications 25. For example, if one or more of the prescriptions change after the packagings 10 are distributed to the patient in carton 120, the care coordinator may contact the patient or patient caregiver and instruct that person to halt the administration of the impacted oral medication 25. After receiving the instructions, the recipient may determine how to best implement this instruction changing administration of the oral medications 25. The correlation of the compartments 14, 16, 18, 20, 22, 24, 26, 28 with the indicia 70 of body 12 and the mapping of the content of each of the compartments 14, 16, 18, 20, 22, 24, 26, 28 with the data in data field 92 on cover 30 can be used to facilitate rapid and simple identification of the impacted oral medication. For example, the care coordinator can inform the patient or patient caregiver that the oral medication 25 contained in the compartment labeled with the number three (3) should not be consumed and, instead, should be discarded.

References herein to terms such as "vertical", "horizontal", "upper", "lower", "raise", "lower", etc. are made by way of example, and not by way of limitation, to establish a frame of reference. It is understood by persons of ordinary skill in the art that various other frames of reference may be equivalently employed for purposes of describing the embodiments of the invention.

It will be understood that when an element is described as being "attached", "connected", or "coupled" to or with another element, the element can be directly connected or coupled to the other element or, instead, one or more intervening elements may be present. In contrast, when an element is described as being "directly attached", "directly connected", or "directly coupled" to another element, there are no intervening elements present. When an element is described as being "indirectly attached", "indirectly connected", or "indirectly coupled" to another element, there is at least one intervening element present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicants' general inventive concept.

What is claimed is:

1. A method of administering a plurality of oral medications from a packaging having a body with a plurality of compartments for holding the oral medications and a cover adhesively attached to the body along a top, general planar surface of the body for confining the oral medications in the compartments, the method comprising:

providing one or more of the oral medications in the packaging, with the compartments of the packaging being organized as a series of wedge-shaped cavities extending radially outwardly in a circular arrangement from a central region defined by the top surface of the body, with triangular-shaped openings into the compartments being separated from openings into adjacent compartments in the circular arrangement by strips defined by the top, generally planar surface of the body, the strips each extending between the central region and a shoulder, which is defined by the top surface of the body and surrounds the plurality of compartments, such that each of the compartments defines sidewalls extending radially outwardly that are spaced apart by gaps from sidewalls of adjacent compartment in the circular arrangement, the gaps located underneath the strips, wherein the top surface of the body defines one or more outer corner regions located outside the circular arrangement of the compartments, with the one or more outer corner regions including non-planar structures defining surface-area reducing features on the body;

closing the packaging by adhesively bonding the cover to an entirety of the top, generally planar surface of the body;

receiving the packaging in a carton, the carton including an outer casing that defines a single interior space to receive and contain the packaging;

receiving additional packagings in the interior space of the carton, the additional packagings containing the same amount and type of oral medications such that every packaging in the carton contains the same amount and type of oral medications, wherein each of the packagings contains all of the oral medications that a patient needs to take at a single medication pass time, and each of the packagings is independent from and not connected to the additional packagings such that the packagings can be individually removed form the carton when needed;

forming a corner pull tab by separating the cover from the top surface of the body along one of the outer corner regions containing the surface-area reducing features and thereby disconnecting the adhesive attachment of the cover from the one of the outer corner regions at the corner pull tab, without disconnecting the adhesive attachment of the cover to a remainder of the top surface of the body;

pulling the corner pull tab to disconnect the adhesive attachment of the cover from the top surface of the body, thereby at least partially detaching the cover from the body to provide access through the separate triangular-shaped opening to each of the compartments in the packaging; and after at least partially detaching the cover form the body, removing all of the oral medications from all the compartments to empty the packaging at once, wherein the packagings are each labeled with a time of day relating to a medication pass, and because the packagings each contain all of the oral medications that a patient needs to take at the time of day labeled on the corresponding packaging, the step of removing all of the oral medications from the compartments provides all of the oral medications that the patient needs to take at the time of day labeled on the corresponding packaging, and wherein the cover and the top surface of the body are each free of score lines, lines of weakening and perforated seams such that the step of at least partially detaching the cover from the body does not include severing one or more of the compartments from a remainder of the plurality of components at the packaging.

2. The method of claim 1, wherein the cover is at least partially detached from the body intact as a single piece.

3. The method of claim 1, wherein each of the compartments holds a single unit dose of one of the oral medications.

4. The method of claim 1, wherein the body includes a plurality of indicia, with each of the indicia marked on one of the compartments such that each of the compartments is uniquely identified by a respective one of the indicia; the cover includes a first surface and a second surface between the first surface and the compartments, with a data field on the first surface comprised of human-readable text correlating one of the indicia with an alphanumeric identifier of the oral medication in each of the compartments; and the method further comprises:

comparing the human-readable text in the data field with the oral medication in each of the compartments to verify that all of the oral medications that a patient needs to take at the time of day labeled on the corresponding packaging are present in the compartments before at least partially detaching the cover from the body to administer the oral medications held in the compartments to the patient, wherein during the at least partially detaching the cover from the body, the cover remains intact such that the data field and machine-readable markings printed on the cover remain readable after opening the compartments of the packaging.

5. The method of claim 4, wherein the human-readable text in the data field also includes information relating to identifying the patient who has been prescribed the oral medications, and the method further comprises:

confirming the information identifying the patient is correct before at least partially detaching the cover from the body to administer the oral medications held in the compartments to the patient.

6. The method of claim 1, further comprising:

receiving instructions to not administer one or more of the oral medications to a patient.

7. The method of claim 1, wherein the corner pull tab is grasped using one or more fingers of one hand, and further comprising:

grasping the body of the packaging with an opposite hand.

8. The method of claim 1, wherein at least partially detaching the cover from the body to access the separate opening to each of the compartments further comprises:

removing the cover from the body.

9. The method of claim 1, further comprising:

after removing all of the oral medications from the compartments to empty the packaging, disposing of the packaging which is non-reusable.

10. The method of claim 1, wherein at least one of the compartments in each of the packagings includes a denesting projection formed along one of the sidewalls and projecting into a storage space defined within the at least one of the compartments, and the method further comprises:

stacking the packagings into a stack with compartments of adjacent packagings aligned such that the denesting projections prevent tight nesting of adjacent packagings that would make the packagings difficult to separate and singulate from the stack.

11. The method of claim 10, wherein each of the compartments includes a denesting projection extending into the storage space defined within the compartments.

12. A method of administering a plurality of oral medications from a packaging having a body with a plurality of compartments for holding the oral medications and a cover adhesively attached to the body along a top, generally planar surface of the body for confining the oral medications in the compartments, the method comprising:

providing one or more of the oral medications in the packaging, with the compartments of the packaging being organized as a series of wedge-shaped cavities extending radially outwardly in a circular arrangement from a central region defined by the top surface of the body, with triangular-shaped openings into the compartments being separated from openings into adjacent compartments in the circular arrangement by strips defined by the top, generally planar surface of the body, the strips each extending between the central region and a shoulder, which is defined by the top surface of the body and surrounds the plurality of compartments, such that each of the compartments defines sidewalls extending radially outwardly that are spaces apart by gaps from sidewalls of adjacent compartments in the circular arrangement, the gaps located underneath the strips, wherein the top surface of the body defines one or more outer corner regions located outside the circular arrangement of the compartments, with the one or more outer corner regions including non-planar structures defining surface-area reducing features on the body;

closing the packaging by adhesively bonding the cover to an entirety of the top, generally planar surface of the body;

receiving the packaging in a carton, the carton including an outer casing that defines a single interior space to receive and contain the packaging;

receiving additional packagings in the interior space of the carton, the additional packagings containing the same amount and type of oral medications such that every packaging in the carton contains the same amount and type of oral medications, wherein each of the packagings contains all of the oral medications that a patient needs to take at a single medication pass time, and each of the packagings is independent from and not connected to the additional packagings such that the packagings can be individually removed from the carton when needed;

forming a corner pull tab by separating the cover from the top surface of the body along one of the outer corner regions containing the surface-area reducing features and thereby disconnecting the adhesive attachment of the cover from the one of the outer corner regions at the corner pull tab, without disconnecting the adhesive attachment of the cover to a remainder of the top surface of the body;

pulling the corner pull tab to disconnect the adhesive attachment of the cover from the top surface of the body, thereby at least partially detaching the cover from the body to provide access through the separate triangular-shaped opening to each of the compartments in the packaging; and after at least partially detaching the cover from the body, removing all of the oral medications from all the compartments to empty the packaging at once, wherein the packagings are each labeled with a time of day relating to a medication pass, and because the packagings each contain all of the oral medications that a patient needs to take at the time of day labeled on the corresponding packaging, the step of removing all of the oral medications from the compartments provides all of the oral medications that the patient needs to take at the time of day labeled on the corresponding packaging, wherein the cover and the top surface of the body are each free of score lines, lines of weakening and perforated seams such that the step of at least partially detaching the cover from the body does not include severing one or more of the compartment from a remainder of the plurality of components at the packaging, wherein the cover is at least partially detached from the body intact as a single piece, wherein each of the compartments holds a single unit dose of one of the oral medications, wherein the body includes a plurality of indicia, with each of the indicia marked on one of the compartments such that each of the compartments is uniquely identified by a respective one of the indicia; the cover includes a first surface and a second surface between the first surface and the compartments, with a data field on the first surface comprised of human-readable text correlating one of the indicia with an alphanumeric identifier of the oral medication in each of the compartments; and the method further comprises comparing the human-readable text in the data field with the oral medication in each of the compartments to verify that all of the oral medications that a patient needs to take at the time of day labeled on the corresponding packaging are present in the compartments before at least partially detaching the cover from the body to administer the oral medications held in the compartments to the patient, wherein during the at least partially detaching the cover from the body, the cover remains intact such that the data field and machine-readable markings printed on the cover remain readable after opening the compartments of the packaging, wherein the human-readable text in the data field also includes information relating to identifying the patient who has been prescribed the oral medications, and the method further comprises confirming the information identifying the patient is correct before at least partially detaching the cover from the body to administer the oral medications held in the compartments to the patient, the method further comprising: receiving instructions to not administer one or more of the oral medications to a patient, wherein the corner pull tab is grasped using one or more fingers of one hand, and the method further comprising grasping the body of the packaging with an opposite hand, wherein at least partially detaching the cover from the body to access the separate opening to each of the compartments further comprises removing the cover from the body, the method further comprising after removing all of the oral medications from the compartments to empty the packaging, disposing of the packaging which is non-reusable, wherein at least one of the compartments in each of the packagings includes a denesting projection formed along one of the sidewalls and projecting into a storage space defined within the at least one of the compartments, and the method further comprises stacking the packagings into a stack with compartments of adjacent packagings aligned such that the denesting projections prevent tight nesting of adjacent packagings that would make the packagings difficult to separate and singulate from the stack, and wherein each of the compartments includes a denesting projection extending into the storage space defined within the compartments.

* * * * *